US 6,664,804 B2

(12) United States Patent
Nakada et al.

(10) Patent No.: US 6,664,804 B2
(45) Date of Patent: Dec. 16, 2003

(54) TRANSMISSION CIRCUIT, DATA TRANSFER CONTROL DEVICE, AND ELECTRONIC EQUIPMENT

(75) Inventors: Akira Nakada, Chino (JP); Akira Abe, Sapporo (JP); Shoichiro Kasahara, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 10/142,066

(22) Filed: May 10, 2002

(65) Prior Publication Data

US 2002/0172151 A1 Nov. 21, 2002

(30) Foreign Application Priority Data

May 14, 2001 (JP) ........................................ 2001-143633

(51) Int. Cl.[7] ........................ H03K 17/16; H03K 19/003
(52) U.S. Cl. ........................... 326/21; 326/82; 326/86; 326/30; 327/52; 710/106
(58) Field of Search ............................ 326/21, 82, 83, 326/86, 30; 327/52, 109; 710/106

(56) References Cited

U.S. PATENT DOCUMENTS 6,032,209 A * 2/2000 Mros et al. ................. 710/103
6,198,311 B1 * 3/2001 Shi et al. ..................... 327/58
6,615,301 B1 * 9/2003 Lee et al. .................... 710/106
2002/0167341 A1 * 11/2002 Nakada ........................ 327/58
2002/0167342 A1 * 11/2002 Nakada ........................ 327/58
2002/0173090 A1 * 11/2002 Nakada et al. .............. 438/200

* cited by examiner

Primary Examiner—Daniel Chang
(74) Attorney, Agent, or Firm—Oliff & Berridge, PLC

(57) ABSTRACT

There are provided a transmission circuit capable of stabilizing high-speed data transfer by driving current, a data transfer control device, and electronic equipment. An HS current driver (transmission circuit) included in a data transfer control device has a current source connected between a first power supply AVDD and a node ND, and switching devices SW1 to SW3, one ends of which are connected to the node ND. The other end of the switching device SW1 is connected to a DP terminal. The other end of the switching device SW2 is connected to a DM terminal. The other end of the switching device SW3 is connected to a DA terminal. The DA terminal is connected to a second power supply AVSS inside or outside the transmission circuit. The transmission circuit is configured so that impedances of each current path from the node ND through the switching devices SW1 to SW3 become substantially equal when the switching device is turned on. This prevents an increase in the voltage of the node ND in a non-signal-transmission period.

39 Claims, 13 Drawing Sheets

US 6,664,804 B2

TRANSMISSION CIRCUIT, DATA TRANSFER CONTROL DEVICE, AND ELECTRONIC EQUIPMENT

Japanese Patent Application No. 2001-143633 filed on May 14, 2001, is hereby incorporated by reference in its entirety.

TECHNICAL FIELD

The present invention relates to a transmission circuit, a data transfer control device, and electronic equipment.

BACKGROUND

In recent years, the Universal Serial Bus (USB) has attracted attention as an interface standard for connecting a personal computer with a peripheral device (electronic equipment in a broad sense). The USB has the advantage of enabling peripheral devices such as a mouse, keyboard, and printer, which are conventionally connected through connectors according to different standards, to be connected through the same standard connectors. Moreover, so-called plug & play and hot plug can be realized by the USB.

However, the USB has a problem in which the transfer rate is lower than that of the IEEE 1394, which has also attracted attention as a serial bus interface standard.

To deal with this problem, the USB 2.0 standard enabling a data transfer rate of 480 Mbps (HS mode), which is remarkably higher than that of the USB 1.1, while maintaining backward compatibility with the USB 1.1 standard has been developed and has attracted attention. The UTMI (USB 2.0 Transceiver Macrocell Interface) which defines the interface specification of the physical layer circuits and part of the logical layer circuits of the USB 2.0 has been also developed.

SUMMARY

One aspect of the present invention relates to a transmission circuit which transmits a signal through first and second signal lines forming a differential pair, the transmission circuit comprising:
  a current source connected between a first power supply and a given node;
  a first switching device inserted between the node and the first signal line;
  a second switching device inserted between the node and the second signal line; and
  a third switching device inserted between the node and a second power supply,
  wherein one of the first and second signal lines is driven by current from the current source through one of the first and second switching devices in a signal-transmission period, and
  wherein the node is connected to the second power supply through the third switching device in a period other than the signal-transmission period.

Another aspect of the present invention relates to a transmission circuit which transmits a signal through a differential pair of first and second signal lines which are terminated at a given impedance Z0, the transmission circuit comprising:
  a current source connected between a first power supply and a given node;
  a first transistor which is inserted between the node and the first signal line and has an impedance substantially equal to an impedance Z0 when the first transistor is turned on;
  a second transistor which is inserted between the node and the second signal line and has an impedance substantially equal to the impedance Z0 when the second transistor is turned on; and
  a third transistor which is inserted between the node and a second power supply and has an impedance twice the impedance Z0 when the third transistor is turned on;
  wherein one of the first and second signal lines is driven by the current source through one of the first and second transistors in a signal-transmission period, and
  wherein the node is connected to the second power supply through the third transistor in a period other than the signal-transmission period.

Still another aspect of the present invention relates to a transmission circuit which transmits a signal through a differential pair of first and second signal lines which are terminated at a given impedance Z0, the transmission circuit comprising:
  a current source connected between a first power supply and a given node;
  first and second connection terminals connected to the first and second signal lines;
  a third connection terminal connected to a second power supply outside the transmission circuit;
  a first transistor which is inserted between the node and the first connection terminal and has an impedance substantially equal to an impedance Z0/2 when the first transistor is turned on;
  a second transistor which is inserted between the node and the second connection terminal and has an impedance substantially equal to the impedance Z0/2 when the second transistor is turned on;
  a third transistor which is inserted between the node and the third connection terminal and has an impedance substantially equal to an impedance Z0 when the third transistor is turned on;
  a first load element which is connected between a first transmission signal line connecting the first transistor with the first connection terminal and the second power supply, and has an impedance substantially equal to the impedance Z0; and
  a second load element which is connected between a second transmission signal line connecting the second transistor with the second connection terminal and the second power supply, and has an impedance substantially equal to the impedance Z0,
  wherein one of the first and second signal lines is driven by the current source through one of the first and second transistors in a signal-transmission period, and
  wherein the node is connected to the second power supply through the third transistor in a period other than the signal-transmission period.

DETAILED DESCRIPTION

Figure 1:
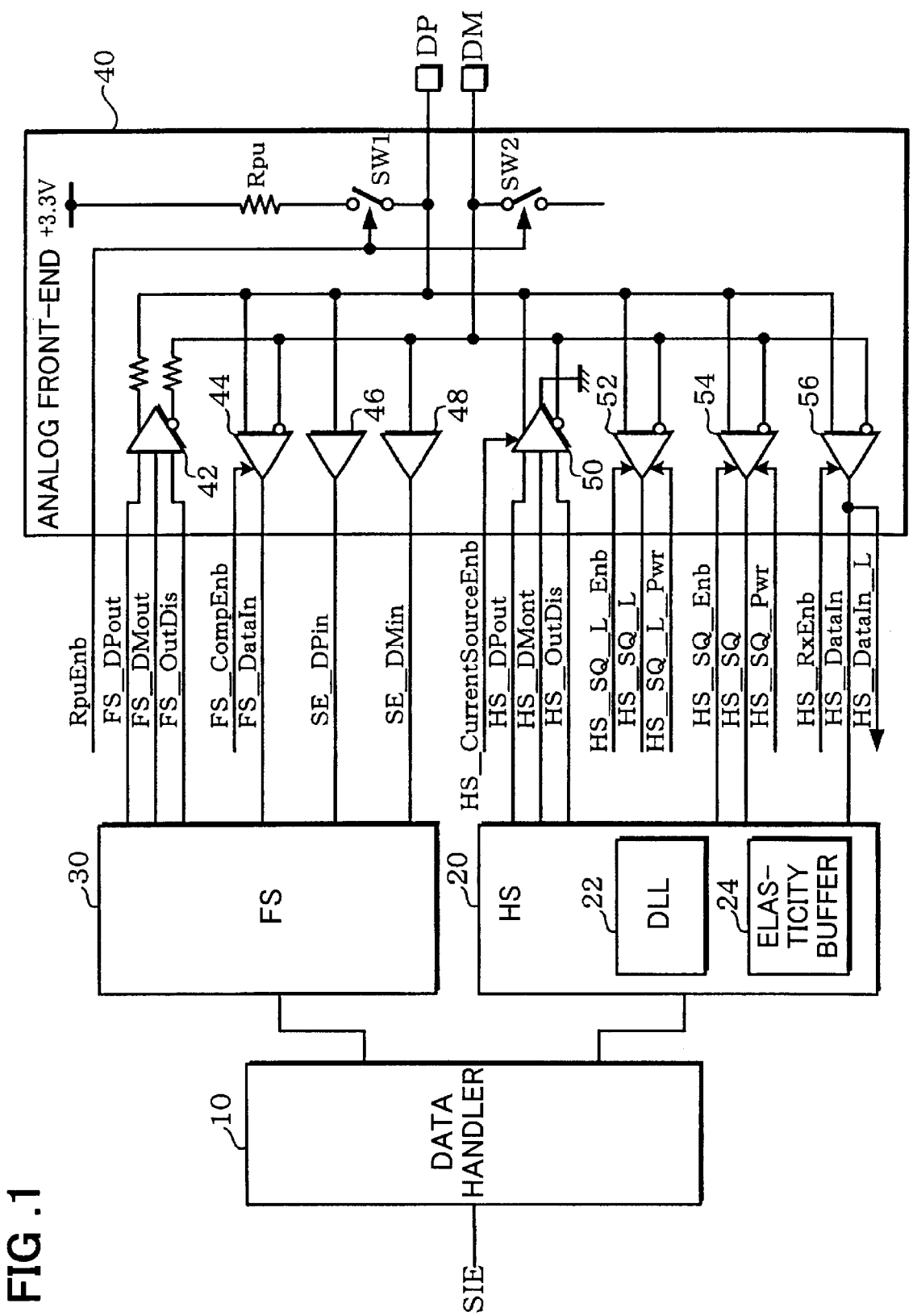
FIG. 1 is a configuration diagram showing an example of a configuration of a data transfer control device to which a transmission circuit according to an embodiment of the present invention is applied.

Embodiments of the present invention are described below.

Note that the embodiments described hereunder do not in any way limit the scope of the invention defined by the claims laid out herein. Note also that all of the elements of these embodiments should not be taken as essential requirements to the means of the present invention.

In the USB 2.0, a transfer mode called an HS (High Speed) mode is added to the FS (Full Speed) mode defined in the USB 1.1. Since data is transferred at a rate of 480 Mbps in the HS mode, data transfer remarkably higher than the FS mode, of which transfer rate is 12 Mbps, can be realized. Therefore, the USB 2.0 can provide an interface suitable for storage devices such as hard disk drives and optical disk drives for which a high-speed transfer rate is required.

The USB 2.0 specifies that data transfer in the HS mode is performed by a current driver. However, the USB 2.0 does not specify the configuration of the current driver in detail. With the USB 2.0, it is only described that it is preferable that current from the current driver be allowed to flow continuously in order to stabilize the operation.

Therefore, an important factor for the configuration of the HS-mode drivers conforming to the USB 2.0 such as the current driver is how to handle the drive current of the current driver in order to achieve high-speed data transfer and stable operation even if a low-cost process is used.

Following embodiments of the present invention have been achieved in view of the above technical subject. According to the following embodiments, a transmission circuit capable of stabilizing high-speed data transfer by driving current, a data transfer control device, and electronic equipment can be provided.

One embodiment of the present invention provides a transmission circuit which transmits a signal through first and second signal lines forming a differential pair, the transmission circuit comprising:

a current source connected between a first power supply and a given node;

a first switching device inserted between the node and the first signal line;

a second switching device inserted between the node and the second signal line; and a third switching device inserted between the node and a second power supply, wherein one of the first and second signal lines is driven by current from the current source through one of the first and second switching devices in a signal-transmission period, and wherein the node is connected to the second power supply through the third switching device in a period other than the signal-transmission period.

In the transmission circuit, in the case of driving current through the first and second signal lines forming the differential pair, current from the current source is supplied to the given node, and the current is supplied to the signal line through which signals are transmitted by exclusively controlling the first and second switching devices connected to the node. The third switching device which is turned on in a period other than the signal-transmission period is connected to the node so that current from the current source is caused to flow through the third switching device in a period other than the signal-transmission period. This prevents an increase in the voltage of the node due to the absence of a current path from the current source in a period other than the signal-transmission period, thereby eliminating a problem that the level of the first transmission signal when the non-signal-transmission period switches to the signal-transmission period is abnormally increased. As a result, transmission operation by driving current can be stabilized.

For example, in the case of performing high-speed signal transmission in which the operation cannot be started nor controlled each time the signal is transmitted by driving current, high-speed signal transmission and stable operation can be achieved at the same time.

The current source may be a constant current source.

Another embodiment of the present invention provides a transmission circuit which transmits a signal through a differential pair of first and second signal lines which are terminated at a given impedance Z0, the transmission circuit comprising:

a current source connected between a first power supply and a given node;

a first transistor which is inserted between the node and the first signal line and has an impedance substantially equal to an impedance Z0 when the first transistor is turned on;

a second transistor which is inserted between the node and the second signal line and has an impedance substantially equal to the impedance Z0 when the second transistor is turned on; and a third transistor which is inserted between the node and a second power supply and has an impedance twice the impedance Z0 when the third transistor is turned on;

wherein one of the first and second signal lines is driven by the current source through one of the first and second transistors in a signal-transmission period, and wherein the node is connected to the second power supply through the third transistor in a period other than the signal-transmission period.

The value of the given impedance Z0 may be an arbitrary impedance value.

In this transmission circuit, in the case of driving current through the first and second signal lines forming the differential pair, current from the current source is supplied to the given node, and the current is supplied to the signal line through which signals are transmitted by exclusively controlling the first and second transistors connected to the node. The third transistor which is turned on in a period other than the signal-transmission period is connected to the node so that current from the current source is caused to flow through the third transistor in a period other than the signal-transmission period. In the case where each of the first and second signal lines is terminated at the given impedance Z0, the transistors are formed so that the first transistor has an impedance substantially equal to the impedance Z0 when turned on, the second transistor has an impedance substantially equal to the impedance Z0 when turned on, and the third transistor has an impedance substantially equal to the impedance "2×Z0" when it is turned on.

Therefore, the output impedances of the node to which current from the current source is supplied are terminated at the impedance "2×Z0" in each path through the first to third transistor. Therefore, in the signal-transmission period and the non-signal-transmission period, substantially the same impedance may be connected to the node when any of the first to third transistors is turned on. As a result, variation of the voltage of the node to which current from the current source is supplied may be substantially the same, and the waveform of the signal output may be the same in the signal-transmission period, when any of the first to third transistors is turned on.

This transmission circuit may comprise a load element having an impedance substantially equal to the impedance Z0, one end of the load element being connected to the second power supply, and the third transistor may have an impedance substantially equal to the impedance Z0 when the third transistor is turned on, and is inserted between the other end of the load element and the node.

In this embodiment, the transmission circuit is configured so that the third transistor connected to the given node has an impedance substantially equal to the impedance Z0 when turned on and is terminated at an impedance substantially equal to the impedance Z0. This also enables the output impedances of the node to which current from the current source is supplied to be terminated at the impedance "2×Z0" in each path through the first to third transistors. Therefore, in the signal-transmission period and the non-signal-transmission period, substantially the same impedance may be connected to the node when any of the first to third transistors is turned on. As a result, variation of the voltage of the node to which current from the current source is supplied may be substantially the same, and the waveform of the signal output may be the same in the signal-transmission period, when any of the first to third transistors is turned on.

Still another embodiment of the present invention provides a transmission circuit which transmits a signal through a differential pair of first and second signal lines which are terminated at a given impedance Z0, the transmission circuit comprising:

a current source connected between a first power supply and a given node;

first and second connection terminals connected to the first and second signal lines;

a third connection terminal connected to a second power supply outside the transmission circuit;

a first transistor which is inserted between the node and the first connection terminal and has an impedance substantially equal to an impedance Z0/2 when the first transistor is turned on;

a second transistor which is inserted between the node and the second connection terminal and has an impedance substantially equal to the impedance Z0/2 when the second transistor is turned on;

a third transistor which is inserted between the node and the third connection terminal and has an impedance substantially equal to an impedance Z0 when the third transistor is turned on;

a first load element which is connected between a first transmission signal line connecting the first transistor with the first connection terminal and the second power supply, and has an impedance substantially equal to the impedance Z0; and a second load element which is connected between a second transmission signal line connecting the second transistor with the second connection terminal and the second power supply, and has an impedance substantially equal to the impedance Z0, wherein one of the first and second signal lines is driven by the current source through one of the first and second transistors in a signal-transmission period, and wherein the node is connected to the second power supply through the third transistor in a period other than the signal-transmission period.

The first to third connection terminals refer to terminals for electrically connecting the transmission circuit with a circuit outside the transmission circuit. As examples of the first to third connection terminals, connection pads for connecting the transmission circuit with other circuits formed on a single substrate when the transmission circuit is formed on a semiconductor substrate, external terminals or I/O pads for connecting the transmission circuit with external devices when the transmission circuit is incorporated in a semiconductor integrated device, and the like can be given.

In this transmission circuit, in the case of driving current through the first and second signal lines forming the differential pair, current from the current source is supplied to the given node, and the current is supplied to the first and second connection terminals connected to the signal lines through which signals are transmitted by exclusively controlling the first and second transistors connected to the node. The third transistor which is turned on in a period other than the signal-transmission period is connected to the node so that current from the current source is caused to flow into the third connection terminal through the third transistor in a period other than the signal-transmission period. In the case where each of the first and second signal lines is terminated at the given impedance Z0, the transistors are formed so that the first transistor has an impedance substantially equal to the impedance Z0/2 when turned on, the second transistor has an impedance substantially equal to the impedance Z0/2 when turned on, and the third transistor has an impedance substantially equal to the impedance Z0 when turned on. The first load element having an impedance substantially equal to the impedance Z0 is connected between the first transmission signal line and the second power supply, and the second load element having an impedance substantially equal to the impedance Z0 is connected between the second transmission signal line and the second power supply.

Therefore, the output impedances of the node to which current from the current source is supplied are terminated at the impedance Z0 in each path through the first to third transistors. Therefore, in the signal-transmission period and the non-signal-transmission period, substantially the same impedance may be connected to the node when any of the first to third transistors is turned on. As a result, variation of the voltage of the node to which current from the current source is supplied may be substantially the same, and the waveform of the signal output may be the same in the signal-transmission period, when any of the first to third transistors is turned on.

This transmission circuit may comprise a third load element which is connected between the third transistor and the third connection terminal and has an impedance substantially equal to the impedance $Z0/2$, and the third transistor may have an impedance substantially equal to the impedance $Z0/2$ when the third transistor is turned on.

In this configuration, the impedance of the third transistor is substantially equal to the impedance $Z0/2$ when turned on, and the third load element having an impedance of $Z0/2$ is connected between the third transistor and the third connection terminal. Therefore, the output impedances of the node to which current from the current source is supplied are terminated at the impedance $Z0$ in each path through the first to third transistors. Therefore, effects the same as those of the above embodiments can be obtained. Moreover, since each transistor connected to the given node has the same shape, variation of the impedance due to process variation when the transistor is turned on can be absorbed.

In the transmission circuit, the third transistor may have an impedance substantially equal to the impedance $Z0/2$ when the third transistor is turned on, and the third connection terminal may by terminated at an impedance substantially equal to the impedance $Z0/2$ outside the transmission circuit.

In this configuration, the impedance of the third transistor is substantially equal to the impedance $Z0/2$ when turned on, and the third load element having an impedance of $Z0/2$ is connected to the third connection terminal outside the transmission circuit. Therefore, the output impedances of the node to which current from the current source is supplied are terminated at the impedance $Z0$ in each path through the first to third transistors. Therefore, effects the same as those of the above embodiments can be obtained. Moreover, since each transistor connected to the given node has the same shape, variation of the impedance due to process variation when the transistor is turned on can be absorbed. In addition, since it is unnecessary to provide a load element in the device, the size and cost of the transmission circuit can be reduced.

The transmission circuit may comprise a fourth load element which is connected between a third transmission signal line connecting the third transistor with the third connection terminal and the second power supply, and has an impedance substantially equal to the impedance $Z0$, the third transistor may have an impedance substantially equal to the impedance $Z0/2$ when the third transistor is turned on, and the third connection terminal may be terminated at an impedance substantially equal to the impedance $Z0$ outside the transmission circuit.

In this configuration, the impedance of the third transistor is substantially equal to the impedance $Z0/2$ when turned on. The fourth load element having an impedance substantially equal to the impedance $Z0$ is connected between the third transmission signal line and the second power supply. The third connection terminal is terminated at the impedance $Z0$ outside the transmission circuit. Therefore, the output impedances of the node to which current from the current source is supplied are terminated at the impedance $Z0$ in each path through the first to third transistors. Therefore, in the signal-transmission period and the non-signal-transmission period, substantially the same impedance may be connected to the node when any of the first to third transistors is turned on. As a result, variation of the voltage of the node to which current from the current source is supplied maybe substantially the same, and the waveform of the signal output may be the same in the signal-transmission period, when any of the first to third transistors is turned on. Moreover, since each transistor connected to the node has the same shape, variation of the impedance due to process variation when the transistor is turned on can be absorbed. Since the transistors and interconnects connected to each connection terminal have the same configuration, the number of design steps such as cell appropriation and layout arrangement can be reduced, and the characteristics of signals output from the pads can easily be made uniform.

The transmission circuit may comprise a fifth load element which is inserted between the third transistor and the second power supply and has an impedance substantially equal to the impedance $Z0/2$, the third transistor may have an impedance substantially equal to the impedance $Z0/2$ when the third transistor is turned on, and the third connection terminal may be omitted.

In this configuration, the impedance of the third transistor is substantially equal to the impedance $Z0/2$ when turned on. The node, to which current from the current source is supplied, is terminated by the fifth load element having an impedance of $Z0/2$ inserted between the third transistor and the second power supply while omitting the third connection terminal. Therefore, the output impedances of the node are terminated at the impedance $Z0$ in each path through the first to third transistors. Therefore, in the signal-transmission period and the non-signal-transmission period, substantially the same impedance may be connected to the node when any of the first to third transistors is turned on. As a result, variation of the voltage of the node to which current from the current source is supplied may be substantially the same, and the waveform of the signal output may be the same in the signal-transmission period, when any of the first to third transistors is turned on. Moreover, since each transistor connected to the node has the same shape, variation of the impedance due to process variation when the transistor is turned on can be absorbed. In addition, the scale and cost of the circuit can be reduced by omitting the third connection terminal.

In the transmission circuit, at least one of the first to third transistors may be an n-type MOS transistor.

According to this configuration, the active direction of a gate signal input to a gate terminal of each transistor can be the same as the active direction of a transmission signal transmitted through each transistor. Therefore, the area of the device can be decreased in comparison with the case of using a p-type MOS transistor. Moreover, noise added to the transmission signal can be removed, whereby a highly reliable transmission signal can be generated.

In the transmission circuit, a signal transmitted through the first and second signal lines, which form the differential pair, may be a signal conforming to the Universal Serial Bus (USB) standard.

In this case, the USB 2.0 standard or a standard developed from the USB 2.0 standard may be used as a given interface standard.

A data transfer control device according to a further embodiment of the present invention comprises: a circuit which performs given transmission processing; and anyone of the above transmission circuits which transmits a signal based on the transmission processing.

Since the data transfer control device includes the above transmission circuit, a data transfer control device capable of achieving high-speed data transfer and performing stable operation can be provided.

Electronic equipment according to a still further embodiment of the present invention comprises: the above data transfer control device; and a device which performs output processing, fetch processing, or storage processing on data transferred through the data transfer control device and a bus.

Since the data transfer control device capable of performing high-speed data transfer and stable operation can be incorporated in the electronic equipment, performance of the electronic equipment can be improved.

Embodiments of the present invention are described below in detail with reference to the drawings.

1. USB 2.0

According to the USB 2.0, a plurality of peripheral devices compliant with the USB 1.1 or USB 2.0 can be connected to a personal computer as the host machine which manages the bus through a hub device.

A host controller compliant with the USB 2.0 is installed in such a host machine. The host controller judges whether the connected device is compliant with either the USB 1.1 or USB 2.0 and controls data transfer through the bus.

A hub controller compliant with the USB 2.0 is installed in the hub device, for example. The hub controller judges whether the device to be connected is compliant with either the USB 1.1 or USB 2.0 and controls the bus transfer mode.

A device controller compliant with the USB 1.1 or USB 2.0 is installed in the peripheral devices. In the case where the device controller is compliant with the USB 2.0, the device controller includes a physical layer circuit compliant with the USB 1.1 and USB 2.0 interface standards, and a logical layer circuit which controls data transfer corresponding to the peripheral device to be installed.

A transmission circuit according to the following embodiments may be applied to transmission circuits included in the physical layer circuit which performs data transfer in the transfer mode conforming to the USB 2.0, for example. The transmission circuit according to the following embodiments is not limited to the application for the data transfer control devices conforming to the USB 2.0 insofar as the transmission circuit transmits a signal by driving current.

2. Data Transfer Control Device

FIG. 1 shows an example of configuration of a data transfer control device to which the transmission circuit according to the following embodiments is applied.

This data transfer control device includes a logical layer circuit and a physical layer circuit.

The logical layer circuit includes a data handler circuit 10, an HS (High Speed) circuit 20, and an FS (Full Speed) circuit 30. The physical layer circuit includes an analog front-end circuit 40. The data transfer control device does not necessary include all the circuit blocks shown in FIG. 1. Some of the circuit blocks may be omitted.

The data handler circuit (given circuit for transferring data in a broad sense) 10 performs various types of transmission processing and reception processing for data transfer according to the USB 2.0. More specifically, the data handler circuit performs processing for adding SYNC (SYN Chronization), SOP (Start Of Packet), and EOP (End Of Packet) to transmission data, bit stuffing processing, and the like at the time of transmitting data. Upon receiving data, the data handler circuit performs processing for detecting and deleting the SYNC, SOP, and EOP of the received data, bit unstuffing processing, and the like. The data handler circuit 10 also performs processing for generating various types of timing signals for controlling transmission and reception of data. The data handler circuit 10 is connected to an SIE (Serial Interface Engine).

The SIE includes an SIE control logic for identifying a USB packet ID and address, and an endpoint logic for performing endpoint processing such as identification of an endpoint number and FIFO control.

The HS circuit 20 is a logic circuit for transmitting and receiving data in the HS (High Speed) mode in which the data transfer rate is 480 Mbps.

The FS circuit 30 is a logic circuit for transmitting and receiving data in the FS (Full Speed) mode in which the data transfer rate is 12 Mbps.

The analog front-end circuit 40 is an analog circuit including drivers and receivers for transmitting and receiving data in the FS mode and the HS mode. In the USB, data is transmitted and received using a differential pair of signals using DP (Data+) and DM (Data−).

This data transfer control device further includes a clock circuit (not shown) for generating a clock signal at 480 MHz used in the HS circuit 20 and a clock signal at 60 MHz used in the device and the SIE, and a control circuit (not shown) for generating various types of control signals of the analog front-end circuit 40.

The HS circuit 20 includes a DLL (Delay Line PLL) circuit 22 and an elasticity buffer 24.

The DLL circuit 22 generates a data sampling clock based on a clock generated from a clock circuit (not shown) and a received signal.

The elasticity buffer 24 is a circuit for absorbing the difference in clock frequency (clock drift) between inside the device and external devices (external devices connected to the bus) and the like.

The USB 2.0 defines the HS mode and the FS mode as the transfer modes. The HS mode is additionally defined in the USB 2.0. The FS mode has been defined in the USB 1.1.

In the HS mode, data is transmitted and received between the data handler circuit 10 and the analog front-end circuit 40 through the HS circuit 20.

In the FS mode, data is transmitted and received between the data handler circuit 10 and the analog front-end circuit 40 through the FS circuit 30.

Therefore, HS-mode drivers and receivers and FS-mode drivers and receivers for transmitting and receiving DP and DM, a differential pair of transmission and reception signals, are separately provided to the analog front-end circuit 40.

More specifically, the analog front-end circuit 40 includes an FS driver 42, FS differential data receiver 44, SE (Single Ended)_DP receiver 46, SE_DM receiver 48, HS current driver (transmission circuit in a broad sense) 50, low-speed HS_SQ (SQuelch)_L circuit 52, high-speed HS_SQ circuit 54, and HS differential data receiver 56.

The FS driver 42 outputs a differential pair of transmission signals consisting of FS_DPout and FS_DMout from the FS circuit 30 as the differential pair of signals consisting of DP and DM in the FS mode. The output of the FS driver 42 is controlled by FS_OutDis from the FS circuit 30.

The FS differential data receiver 44 amplifies the differential pair of received signals DP and DM and outputs FS_DataIn to the FS circuit 30 in the FS mode. The amplification of the FS differential data receiver 44 is controlled by FS_CompEnb.

The SE_DP receiver 46 amplifies the single ended received signal DP and outputs SE_DPin to the FS circuit 30 in the FS mode.

The SE_DM receiver 48 amplifies the received single ended signal DM and outputs the signal as SE_DMin to the FS circuit 30 in the FS mode.

The HS current driver 50 amplifies the differential pair of signals HS_DPout and HS_DMout from the HS circuit 20 and outputs the differential pair of signals DP and DM in the HS mode. The output of the HS current driver 50 is controlled by HS_OutDis from the HS circuit 20. The drive current of the HS current driver 50 is controlled by HS_CurrentSourceEnb.

The low-speed HS_SQ_L circuit 52 precisely detects the presence or absence of the differential pair of received signals DP and DM and outputs HS_SQ_L as the signal detection results. The operation of the low-speed HS_SQ_L circuit 52 is controlled by HS_SQ_L_Enb. The power consumption of the low-speed HS_SQ_L circuit 52 is controlled by HS_SQ_L_Pwr.

The high-speed HS_SQ circuit 54 detects the presence or absence of the differential pair of received signals DP and DM and outputs HS_SQ to the HS circuit 20 as the signal detection results. The operation of the high-speed HS_SQ circuit 54 is controlled by HS_SQ_Enb from the HS circuit 20. The power consumption of the high-speed HS_SQ circuit 54 is controlled by HS_SQ_Pwr.

The HS differential data receiver 56 amplifies the differential pair of received signals DP and DM and outputs HS_DataIn and HS_DataIn_L in the HS mode. The amplification of the HS differential data receiver 56 is controlled by HS_RxEnb.

The DP of the differential pair of transmission and reception signals DP and DM is (electrically) connected to a power supply voltage of 3.3 V through an SWA and a pull-up resistor Rpu. The DM of the differential pair of transmission and received signals is connected to an SWB. The SWA and SWB are controlled by RpuEnb. Taking the load balance into consideration, the DM may be connected to a resistance equivalent to the pull-up resistor Rpu through the SWB. RpuEnb at least allows the DP to be connected to the pull-up resistor Rpu through the SWA in the FS mode.

The data transfer control device includes the drivers and receivers corresponding to the transfer rates in the HS mode and the FS mode as described above.

2.1 Configuration of Transmission/Reception System

Figure 2:
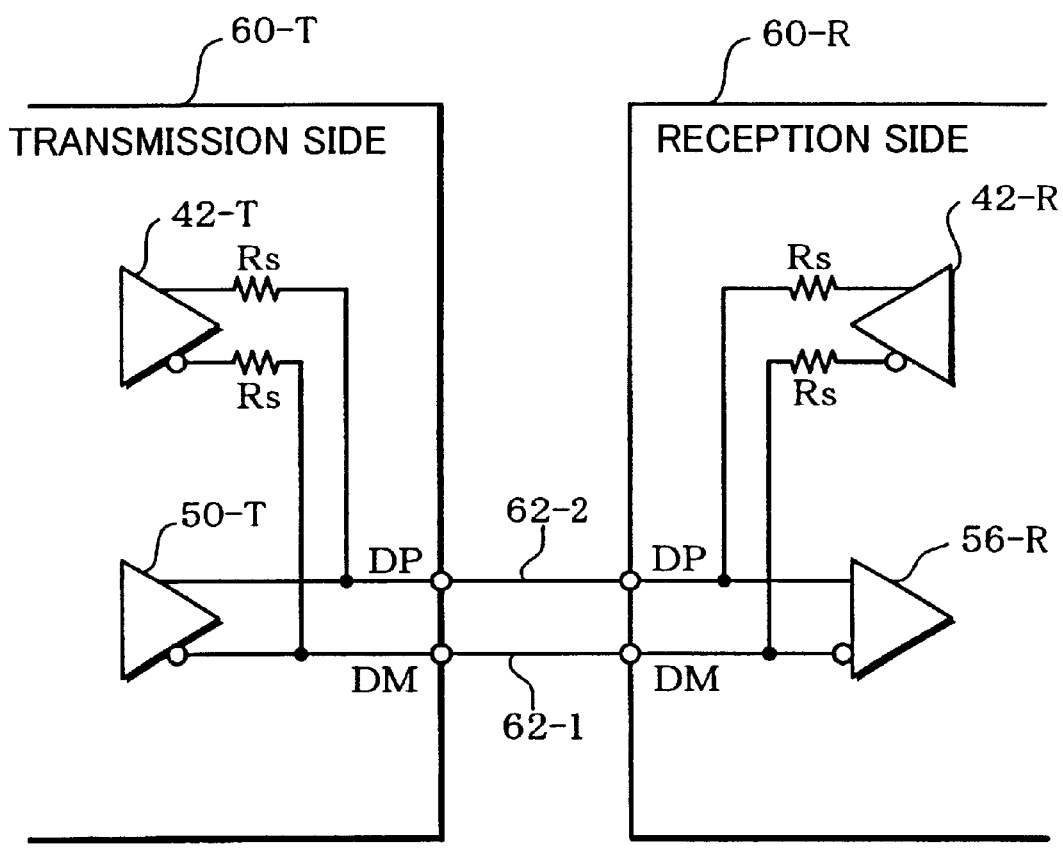
FIG. 2 is a configuration diagram showing an example of main part of a transmission and reception system in the case of transferring data in the HS mode.

FIG. 2 shows an example of main part of a transmission/reception system in the case of transferring data in the HS mode using the data transfer control device shown in FIG. 1.

In the case of transferring data in the HS mode, a data transfer control device 60-T on the transmission side and a data transfer control device 60-R on the reception side including the above physical layer circuit are connected through a differential pair of signal lines (first and second signal lines in a broad sense) 62-1 and 62-2, through which the differential pair of transmission and reception signals DP and DM are transferred.

According to the USB 2.0, the drivers and receivers corresponding to the transfer rates in HS-mode and the FS-mode are separately provided as described above. Therefore, the drivers and receivers in each mode are connected in common with the differential pair of signal lines (first and second signal lines 62-1 and 62-2).

The analog front-end circuit of the data transfer control device 60-T on the transmission side includes at least an FS driver 42-T and an HS current driver 50-T. The analog front-end circuit of the data transfer control device 60-R on the reception side includes at least an FS driver 42-R and an HS differential data receiver 56-R.

The USB 2.0 specifies an output impedance of Z0 (45Ω±10%) at the time of data transfer in the HS mode. Termination resistors having an impedance of Rs equivalent to this output impedance are connected to each of the first and second signal lines 62-1 and 62-2 in the data transfer control devices.

The termination resistors are connected to the FS driver. Therefore, when the FS driver drives "0" in the HS mode, the termination resistors are used as termination resistors of the signal lines in the HS mode.

The FS driver 42-T drives "0" through the first and second signal lines 62-1 and 62-2 by the output control using FS_OutDis shown in FIG. 1, for example. As a result, the first and second signal lines 62-1 and 62-2 are pulled down through the termination resistors in the data transfer control device 60-T on the transmission side.

The HS current driver 50-T amplifies the differential pair of signals consisting of HS_DPout and HS_DMout from the HS circuit (not shown) by the output control using HS_OutDis and the supply control of drive current using HS_CurrentSourceEnb shown in FIG. 1, for example.

The FS driver 42-R drives "0" through the first and second signal lines 62-1 and 62-2 by the output control using FS_OutDis shown in FIG. 1, for example. As a result, the first and second signal lines 62-1 and 62-2 are pulled down through the termination resistors in the data transfer control device 60-R on the reception side.

The HS differential data receiver 56-R amplifies the differential pair of received signals through the first and second signal lines 62-1 and 62-2 by the output control using HS_RxEnb shown in FIG. 1, and outputs HS_DataIn and HS_DataIn _L, for example.

The HS current driver 50-T of the data transfer control device 60-T on the transmission side drives current through the first and second signal lines 62-1 and 62-2 terminated by the termination resistors on the transmission side and the reception side corresponding to the transmission signal.

3. Transmission Circuit 3.1 Current Path

Figure 3:
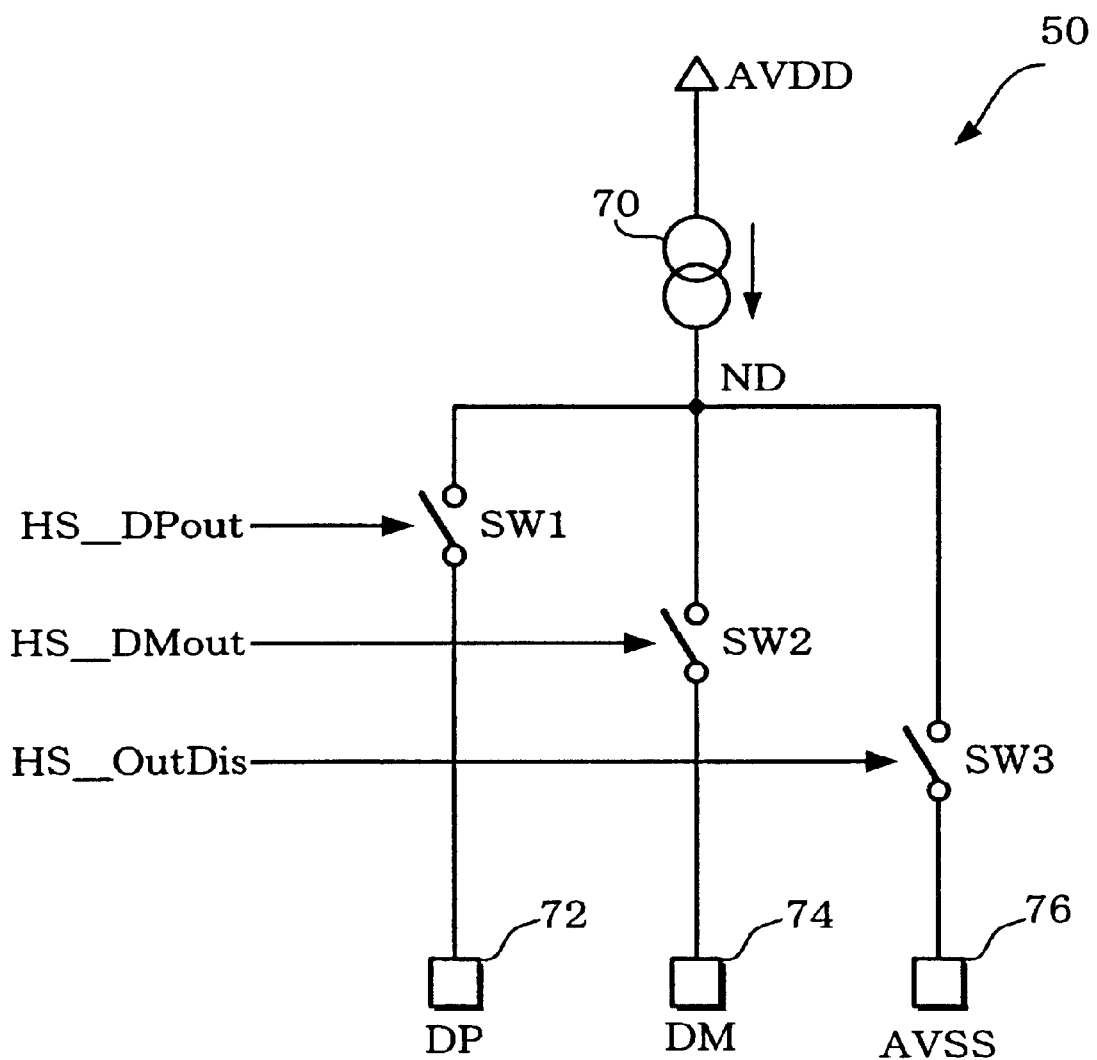
FIG. 3 is a configuration diagram showing an outline of a configuration of an HS current driver.

FIG. 3 shows an outline of the configuration of the HS current driver.

The HS current driver 50 includes a current source 70 connected between a first power supply AVDD and a node ND, and switching devices SW1 to SW3 connected to the node ND on one end. The other end of the switching device SW1 is connected to a DP terminal (connection terminal in a broad sense) 72. The other end of the switching device SW2 is connected to a DM terminal 74. The other end of the switching device SW3 is connected to a DA terminal 76. The DA terminal 76 is connected to a second power supply AVSS either inside or outside the circuit.

In the case where the HS current driver is integrated in the semiconductor integrated device, one of a DP pad as the DP terminal 72, a DM pad as the DM terminal 74, and a DA pad (or AVSS pad) as the DA terminal 76 is electrically connected with the current source 70. The pads refer to electrodes as the connection terminals disposed along the periphery of the semiconductor integrated device, for example. Each pad is associated with each terminal of a package and electrically connected therewith.

The HS current driver 50 is designed so that current from the current source 70 flows into one of the DP terminal 72, DM terminal 74, and DA terminal 76 by exclusively controlling the switching devices SW1 to SW3.

More specifically, in the case of transmitting DP "1", the HS current driver 50 turns on the switching device SW1 using HS_DPout and turns off the switching devices SW2 and SW3, thereby causing current from the current source 70 to flow into the DP terminal 72.

In the case of transmitting DM "1", the HS current driver 50 turns on the switching device SW2 using HS_DMout and turns off the switching devices SW1 and SW3, thereby causing current from the current source 70 to flow into the DM terminal 74.

In a non-signal-transmission period other than a signal-transmission period of DP "1" or DM "1", the HS current driver 50 turns on the switching device SW3 using HS_OutDis and turns off the switching devices SW1 and SW2, thereby causing current from the current source 70 to flow into the DA terminal 76.

This prevents an increase in the voltage of the node ND occurring when providing no current path from the current source 70 in the non-signal-transmission period.

Figure 4:
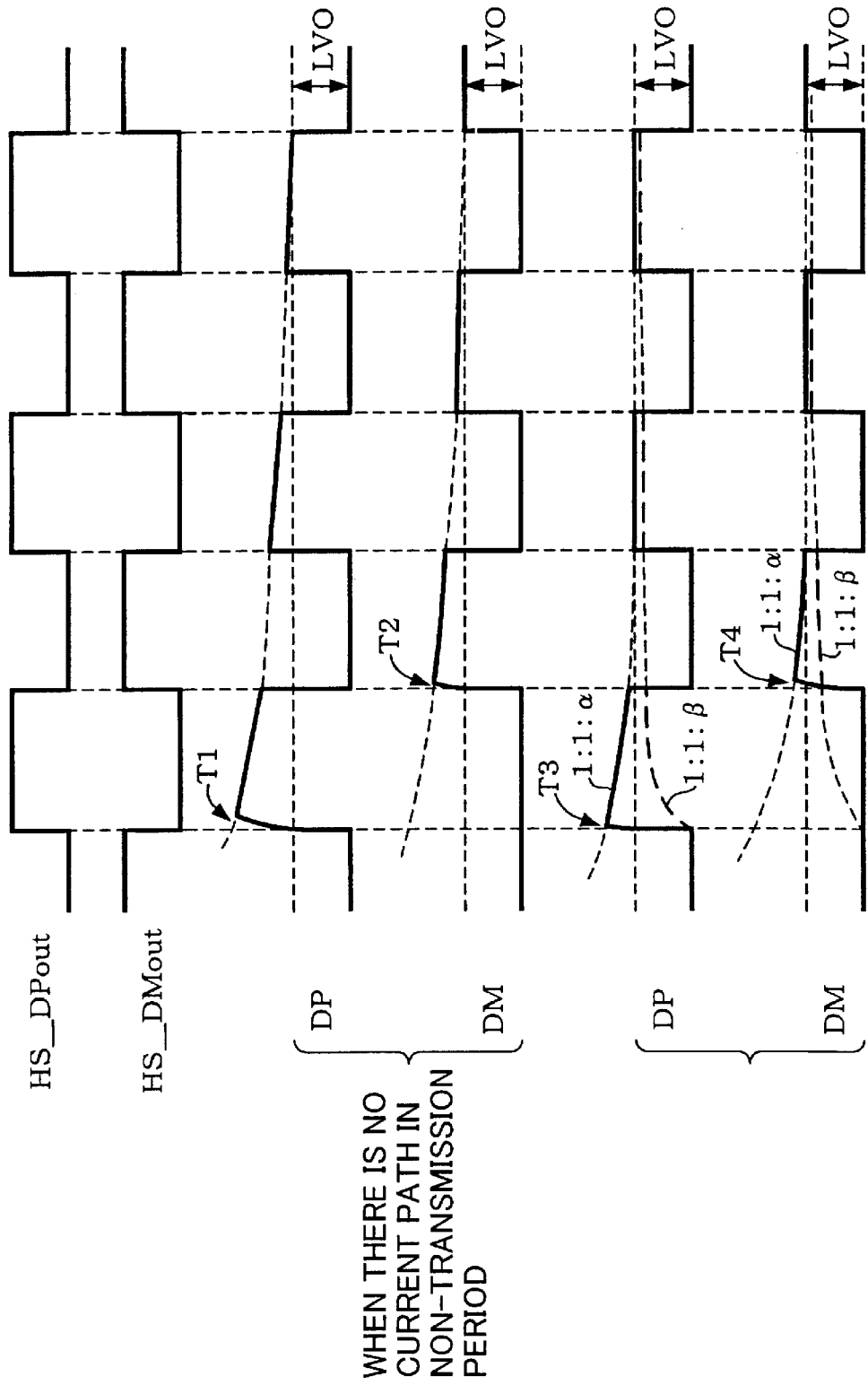
FIG. 4 is an explanatory diagram showing an example of waveforms of a differential pair of transmission signals transmitted by the HS current driver.

FIG. 4 shows an example of waveforms of the differential pair of transmission signals transmitted by the HS current driver.

As shown in FIG. 3, HS_DPout and HS_DMout which perform logic operation exclusively in a state in which both edges are aligned are supplied to the HS current driver 50 from the HS circuit (not shown).

Generally, it is possible to control start and termination of the operation of the current source 70. However, since stabilization of the operation of the current source 70 requires a considerable period of time, it is difficult to start or terminate the operation of the current source 70 each time the data is transmitted in the case of performing high-speed transfer in the HS mode. Therefore, it is necessary to cause current to flow continuously from the current source 70 in order to ensure stable operation of the current source 70.

In the case where the current is continuously supplied from the current source 70, if there is no current path through the switching device SW3 in the non-signal-transmission period, the voltage of the node ND is increased due to current continuously flowing from the current source 70.

At this time, when the switching device SW1 is turned on by HS_DPout indicated by T1 in FIG. 4, the voltage of the DP exceeds a specified level of LV0. Specifically, a problem occurs in which the voltage of the DP output by HS_DPout is increased at the first T1 when entering the signal-transmission period from the non-signal-transmission period. The voltage of the DP reaches the voltage LV0 which should be output in the signal-transmission period with the passage of time.

This also applies to the DM. When the switching device SW2 is turned on by HS_DMout at a T2 after the T1, the voltage of the DM may exceed the specified level LV0. The voltage of the DM reaches the voltage LV0 which should be output in the signal-transmission period with the passage of time.

In FIG. 3, an increase in the voltage of the node ND in the non-signal-transmission period is prevented by causing current from the current source 70 to flow into the DA terminal through the switching device SW3 in the non-signal-transmission period. This prevents the output level of the first transmission signal when entering the signal-transmission period from the non-signal-transmission period from exceeding the specified level, thereby stabilizing the operation.

3.2 Impedance

In the case of driving current through the first and second signal lines 62-1 and 62-2 by the HS current driver 50, the level of the transmission signal is determined depending upon the impedance from the node ND to the receiving end.

An impedance from the node ND to the receiving end through the switching device SW1 and the first signal line 62-1 is referred to as Zp, an impedance from the node ND to the receiving end through the switching device SW2 and the second signal line 62-2 is referred to as Zm, and an impedance from the node ND to the second power supply AVSS through the switching device SW3 and the DA terminal 74 is referred to as Za.

Even if the current path to the DA terminal in the non-signal-transmission period is provided, the voltage of the node ND is increased when "Zp:Zm:Za=1:1:$\alpha$" ($1<\alpha$) since the impedance of the current path to the DA terminal is high. At this time, when the switching device SW1 is turned on by HS_DPout indicated by a T3 in FIG. 4, the voltage of the DP may exceed the specified level LV0. This causes a problem in which the voltage of the DP output by HS_DPout is increased at the first T3 when entering the signal-transmission period from the non-signal-transmission period. The voltage of the DP reaches the voltage LV0 which should be output in the signal-transmission period with the passage of time.

This also applies to the DM. When the switching device SW2 is turned on by HS_DMout at a T4 after the T3, the voltage of the DM may exceed the specified level LV0. The voltage of the DM reaches the voltage LV0 which should be output in the signal-transmission period with the passage of time.

Even if the current path to the DA terminal in the non-signal-transmission period is provided, the voltage of the node ND is decreased when "Zp:Zm:Za=1:1:$\beta$" ($0<\beta<1$) since the impedance of the current path to the DA terminal is low. At this time, when the switching device SW1 is turned on by HS_DPout indicated by the T3 in FIG. 4, the voltage of the DP does not reach the specified level LV0. This causes a problem in which the voltage of the DP output by HS_DPout is decreased at the first T3 when entering the signal-transmission period from the non-signal-transmission period, whereby the transmission signal may not be detected normally at the receiving end. The voltage of the DP reaches the voltage LV0 which should be output in the signal-transmission period with the passage of time.

This also applies to the DM. When the switching device SW2 is turned on by HS_DMout at the T4 after the T3, the voltage of the DM may not reach the specified level LV0. The voltage of the DM reaches the voltage LV0 which should be output in the signal-transmission period with the passage of time.

In the case where the impedance of each current path from the node ND is nonuniform, not only does the level of the signal output through each path become nonuniform, but also the voltage of the node ND varies.

The first and second signal lines 62-1 and 62-2 have an impedance of Z0 specified by the termination resistors on the transmission side and the reception side and the resistance of the signal lines as described above. In FIG. 3, the impedance of the path through which current from the current source 70 flows to the DA terminal through the switching device SW3 in the non-signal-transmission period is made substantially equal to this impedance in order to make the impedance of each current path equal.

Data transfer in the HS mode can be realized by thus configuring the HS current driver in which the impedance is adjusted, for example. Moreover, the operation of the current source needed therefor is stabilized, whereby stable high-speed data transfer can be achieved.

3.3 Configuration Example of Transmission Circuit

A specific configuration of the transmission circuit which can be applied to such an HS current driver is described below.

First Embodiment

Figure 5:
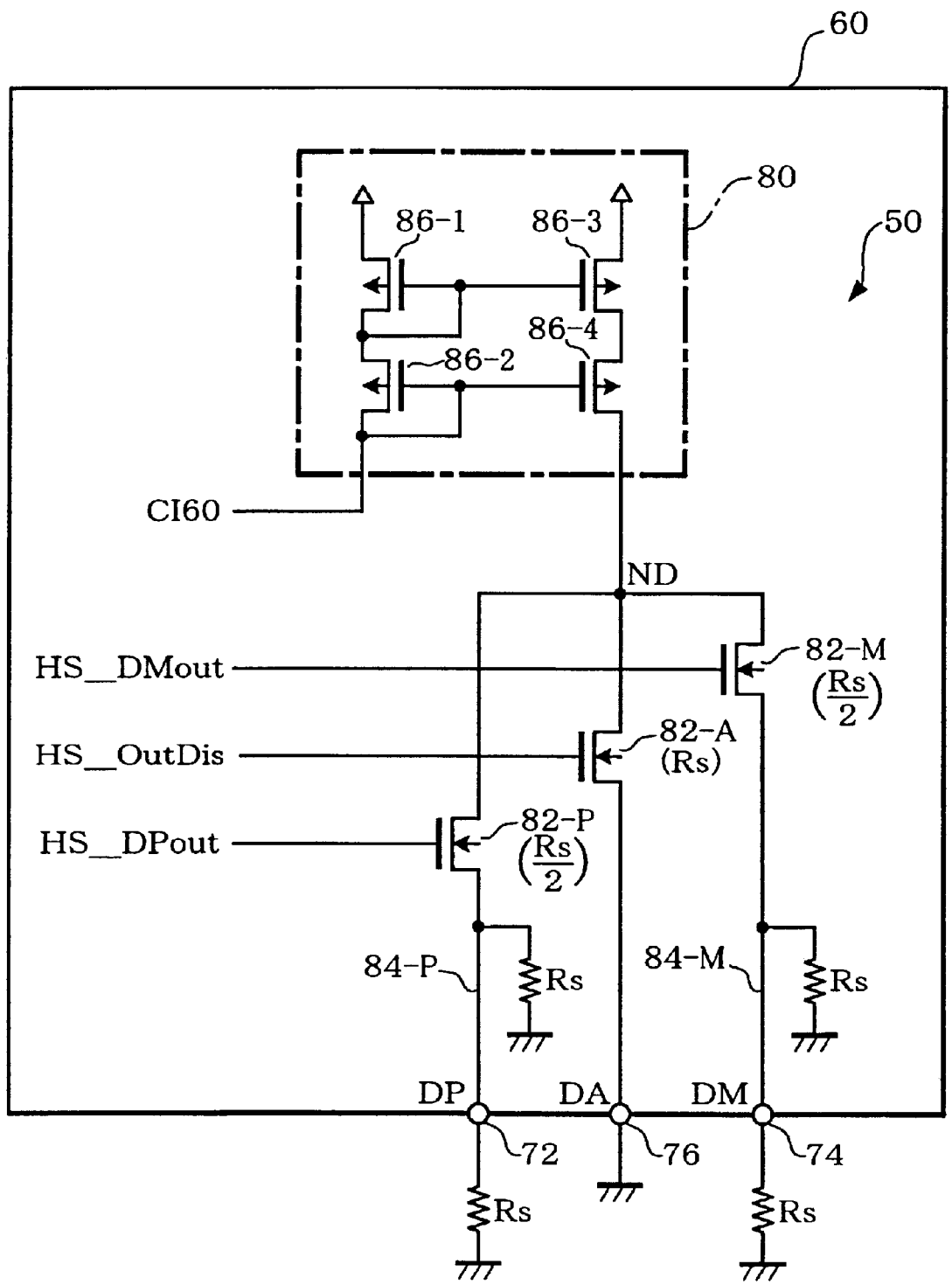
FIG. 5 is a configuration diagram showing an example of a configuration of a transmission circuit of a first embodiment.

FIG. 5 shows a configuration example of a transmission circuit of the first embodiment.

The transmission circuit 50 of the first embodiment transmits a signal conforming to the USB 2.0 in a data transfer control device 60. The data transfer control device 60 includes the DP terminal 72, DM terminal 74, and DA terminal 76.

The DP terminal 72 is electrically connected to the first signal line 62-1 which forms the differential pair of signal lines. The DM terminal 74 is electrically connected to the second signal line 62-2 which forms the differential pair of signal lines. The DA terminal 76 is electrically connected to the second power supply AVSS.

The transmission circuit 50 includes a constant current source 80, an n-type MOS transistor 82-P as the switching device SW1, an n-type MOS transistor 82-M as the switching device SW2, and an n-type MOS transistor 82-A as the switching device SW3.

The operation of the constant current source 80 is controlled by a current source control signal CI60. The constant current source 80 supplies current with a given constant current value corresponding to the current value of the current source control signal CI60 to the node ND.

The node ND is connected to source terminals of the n-type MOS transistors 82-P, 82-M, and 82-A.

A drain terminal of the n-type MOS transistor 82-P is connected to the DP terminal 72, and HS_DPout from the HS circuit is supplied to a gate terminal of the n-type MOS transistor 82-P.

A drain terminal of the n-type MOS transistor 82-M is connected to the DM terminal 74, and HS_DMout from the HS circuit is supplied to a gate terminal of the n-type MOS transistor 82 -M.

A drain terminal of the n-type MOS transistor 82-A is connected to the DA terminal 76, and HS_OutDis from the HS circuit is supplied to a gate terminal of the n-type MOS transistor 82-A.

A first transmission signal line 84-P which electrically connects the drain terminal of the n-type MOS transistor 82-P to the DP terminal 72 is terminated by the termination resistor of the FS driver as described above. Therefore, a resistance element having an impedance of Rs is schematically connected between the first transmission signal line 84-P and the second power supply AVSS in FIG. 5.

A second transmission signal line 84-M which electrically connects the drain terminal of the n-type MOS transistor 82-M to the DM terminal 74 is terminated by the termination resistor of the FS driver as described above. Therefore, a resistance element having an impedance of Rs is schematically connected between the second transmission signal line 84-M and the second power supply AVSS in FIG. 5.

In the first embodiment, the n-type MOS transistors 82-P and 82-M are formed in the shape whereby the impedances of the n-type MOS transistors 82-P and 82-M are Rs/2 when turned on by HS_DPout and HS_DMout, respectively.

The n-type MOS transistor 82-A is formed in the shape whereby the impedance of the n-type MOS transistor 82-A is Rs when turned on by HS_OutDis.

The channel width of the n-type MOS transistor 82-P is referred to as Wp, the channel width of the n-type MOS transistor 82-M is referred to as Wm, and the channel width of the n-type MOS transistor 82-A is referred to as Wa. Transistors having the above impedances can be easily realized by achieving the impedance Rs/2 by the channel width Wp (Wm) while allowing the channel length L of each transistor to be uniform and adjusting "Wp:Wm:Wa" to "1:1:0.5", for example.

The constant current source 80 is a two-stage current mirror circuit including p-type MOS transistors 86-1 to 86-4.

Specifically, a source terminal of the p-type MOS transistor 86-1 is connected to the first power supply AVDD, and a drain terminal of the p-type MOS transistor 86-1 is connected to a source terminal of the p-type MOS transistor 86-2. A gate terminal and the drain terminal of the p-type MOS transistor 86-1 are connected with each other. A gate terminal and a drain terminal of the p-type MOS transistor 86-2 are connected with each other.

The current source control signal CI60 is supplied to the drain terminal of the p-type MOS transistor 86-2.

A source terminal of the p-type MOS transistor 86-3 is connected to the first power supply AVDD, and a drain terminal of the p-type MOS transistor 86-3 is connected to a source terminal of the p-type MOS transistor 86-4. A gate terminal of the p-type MOS transistor 86-3 is connected to the gate terminal of the p-type MOS transistor 86-1. A gate terminal of the p-type MOS transistor 86-4 is connected to the gate terminal of the p-type MOS transistor 86-2.

A drain terminal of the p-type MOS transistor 86-4 is connected to the node ND.

The constant current source 80 can generate stable current with a constant current value due to the two-stage current mirror structure. The constant current source 80 supplies current with a constant current value with a given mirror ratio to the current value supplied by the current source control signal CI60 to the node ND.

In the transmission circuit having the above configuration, the impedances of the current paths through the n-type MOS transistors 82-P, 82-M, and 82-A from the node ND are substantially equal to Rs.

Specifically, in the case of transmitting DP "1", constant current supplied to the node ND is driven through the impedance Rs from the node ND by turning on the n-type MOS transistor 82-P by HS_DPout.

In the case of transmitting DM "1", constant current supplied to the node ND is driven through the impedance Rs from the node ND by turning on the n-type MOS transistor 82-M by HS_DMout.

In the non-signal-transmission period in which "0" is transmitted to the DP and DM, constant current supplied to the node ND is driven through the impedance Rs from the node ND by turning on the n-type MOS transistor 82-A.

Therefore, data transfer in the HS mode can be realized by adjusting the impedance Rs to the output impedance of the HS current driver conforming to the USB 2.0.

Figure 6:
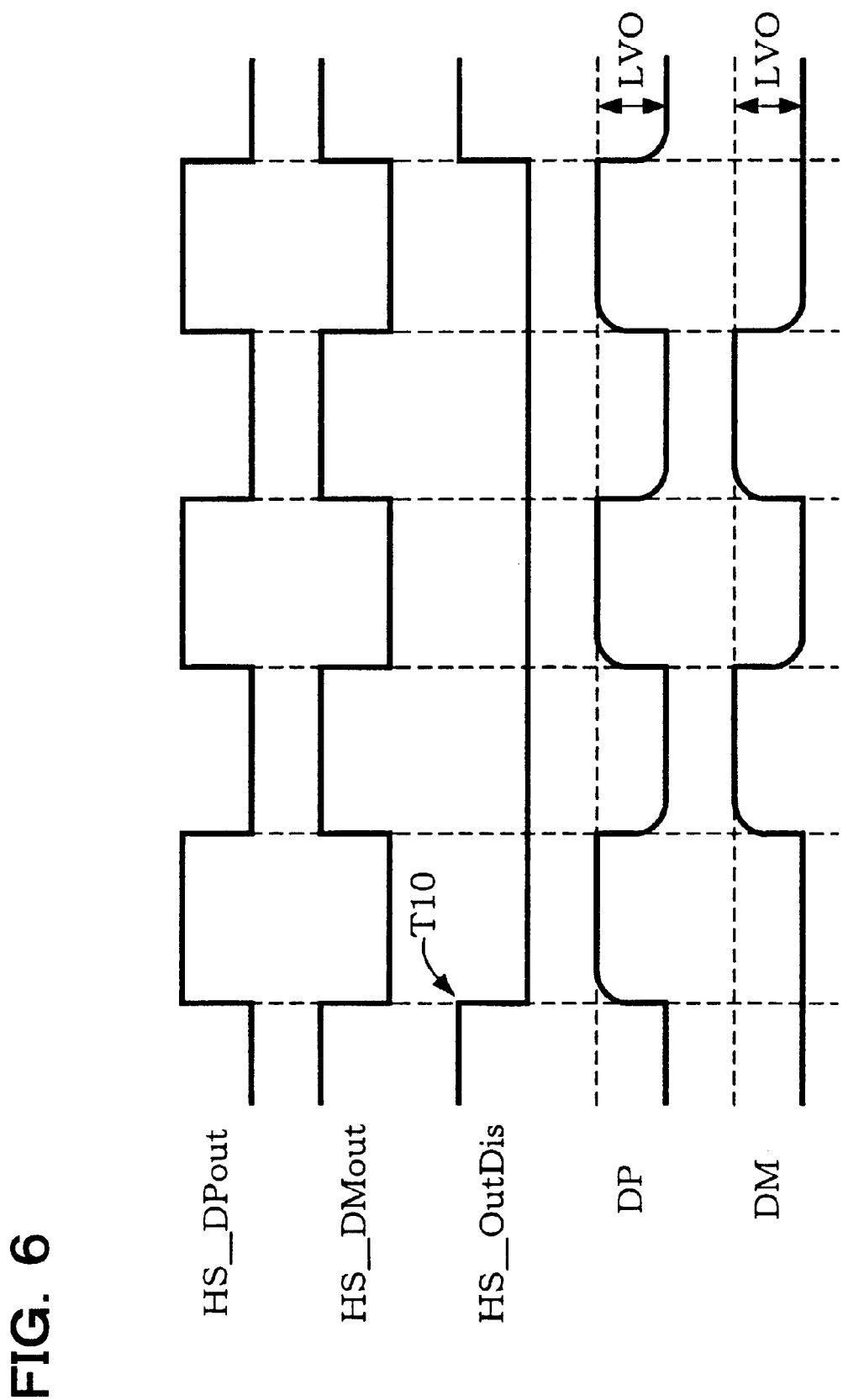
FIG. 6 is an explanatory diagram showing an example of waveforms of a differential pair of transmission signals transmitted by the transmission circuit of the first embodiment.

FIG. 6 shows an example of waveforms of the differential pair of transmission signals transmitted by the transmission circuit of the first embodiment.

The transmission circuit of the first embodiment is formed so that the impedances of the current paths from the node ND are equal by providing the current path for the constant current source in the non-signal-transmission period as described above. This ensures that the voltage of the DP output by HS_DPout at a first T10 when entering the signal-transmission-period from the non-signal-transmission period is output at the level LV0 which should be output in the signal-transmission-period, thereby eliminating a problem in which a nonstandardized signal level is output.

One of the features of the first embodiment is that the n-type MOS transistors are used as the switching devices, as shown in FIG. 5.

Figure 7A:
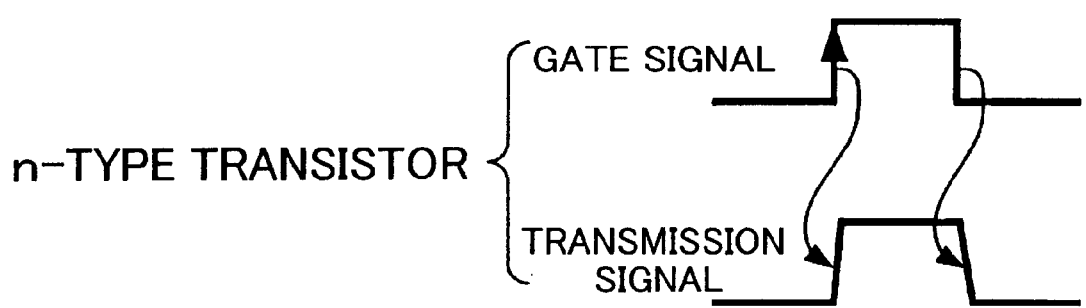
FIG. 7A is an explanatory diagram schematically showing an outline of a waveform of a transmission signal in the case of using an n-type MOS transistor as a switching device.
Figure 7B:
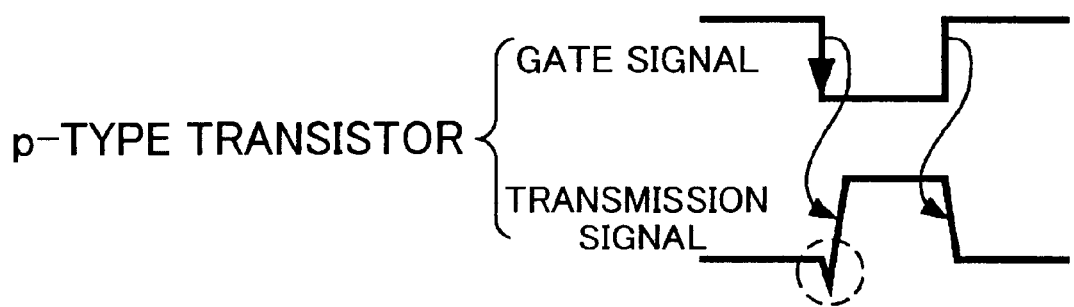
FIG. 7B is an explanatory diagram schematically showing an outline of a waveform of a transmission signal in the case of using a p-type MOS transistor as the switching device.

FIGS. 7A and 7B schematically show outlines of the waveforms of the transmission signals in the case of using an n-type MOS transistor and a p-type MOS transistor as the switching device.

As shown in FIG. 7A, in the case of using the n-type MOS transistor as the switching device, the active direction of the gate signal (HS_DPout, HS_DMout, and HSOutDis in FIG. 5) supplied to the gate terminal is the same as the active direction of the transmission signal (DP and DM in FIG. 5) output through the source terminal and the drain terminal of the n-type MOS transistor when the gate signal becomes active.

In the case of using the p-type MOS transistor as the switching device as shown in FIG. 7B, the active direction of the gate signal supplied to the gate terminal is opposite to the active direction of the transmission signal output through the source terminal and the drain terminal of the p-type MOS transistor. In this case, since the current flows between the source terminal and the drain terminal of the p-type MOS transistor after the gate signal becomes a logic level of "L", noise in the negative direction may be added to the transmission signal.

Therefore, use of the n-type MOS transistor as the switching device enables the device area to be decreased and noise added to the transmission signal to be removed in comparison with the case of using the p-type MOS transistor, as shown in FIG. 7A. As a result, a highly reliable transmission signal can be generated.

Second Embodiment

Figure 8:
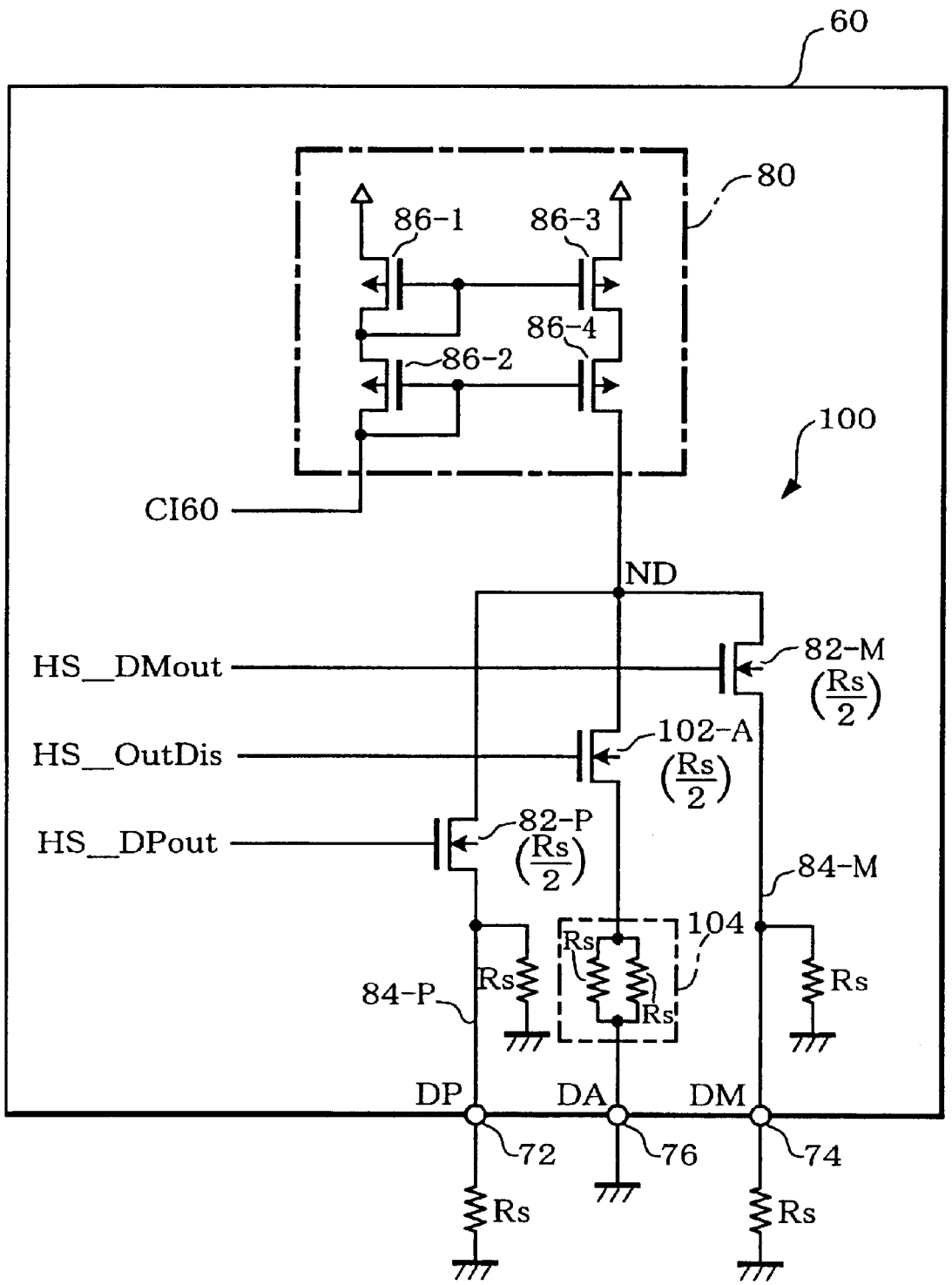
FIG. 8 is a configuration diagram showing an example of a configuration of a transmission circuit of a second embodiment.

FIG. 8 shows a configuration example of a transmission circuit of the second embodiment.

In FIG. 8, sections the same as those of the transmission circuit of the first embodiment shown in FIG. 5 are indicated by the same symbols. Description of these sections is omitted.

A transmission circuit 100 of the second embodiment transmits a signal conforming to the USB 2.0 in the data transfer control device 60.

The first difference between the transmission circuit 100 of the second embodiment and the transmission circuit 50 of the first embodiment is that the shape of an n-type MOS transistor 102-A used as the switching device SW3 differs from that of the n-type MOS transistor 82-A.

The second difference between the transmission circuit 100 of the second embodiment and the transmission circuit 50 of the first embodiment is that a resistance element 104 having an impedance of Rs/2 is inserted between the drain terminal of the n-type MOS transistor 102-A and the DA terminal 76.

Specifically, in the transmission circuit 100, the n-type MOS transistor 102-A is formed in the same shape as the n-type MOS transistors 82-P and 82-M so that Wp:Wm:Wa is 1:1:1, whereby the impedance of the on-resistance when the n-type MOS transistor 102-A is turned on by HS_OutDis becomes Rs/2. Moreover, the resistance element 104 having an impedance of Rs/2 is inserted between the drain terminal of the n-type MOS transistor 102-A and the DA terminal 76.

This enables the impedance of the current path from the node ND to the DA terminal 76 to be Rs, whereby the impedances of the current paths from the node ND through the n-type MOS transistors 82-P, 82-M, and 102-A are substantially equal to Rs.

The operation of the transmission circuit 100 of the second embodiment having the above configuration is the same as that of the transmission circuit 50 in the first embodiment. Therefore, further description is omitted.

Therefore, the transmission circuit 100 of the second embodiment has effects the same as those of the transmission circuit 50 of the first embodiment. Moreover, since the transistors connected to the node ND as the switching devices have the same shape, variation of the on-resistance of each transistor connected to the node ND due to process variation can be absorbed. In the case of forming the resistance element 104 by connecting resistance elements having the same configuration as that of the termination resistors connected to the first and second transmission signal lines 84-M and 84-P in parallel, variation of the resistance value of each resistance element due to process variation can be absorbed.

Third Embodiment

Figure 9:
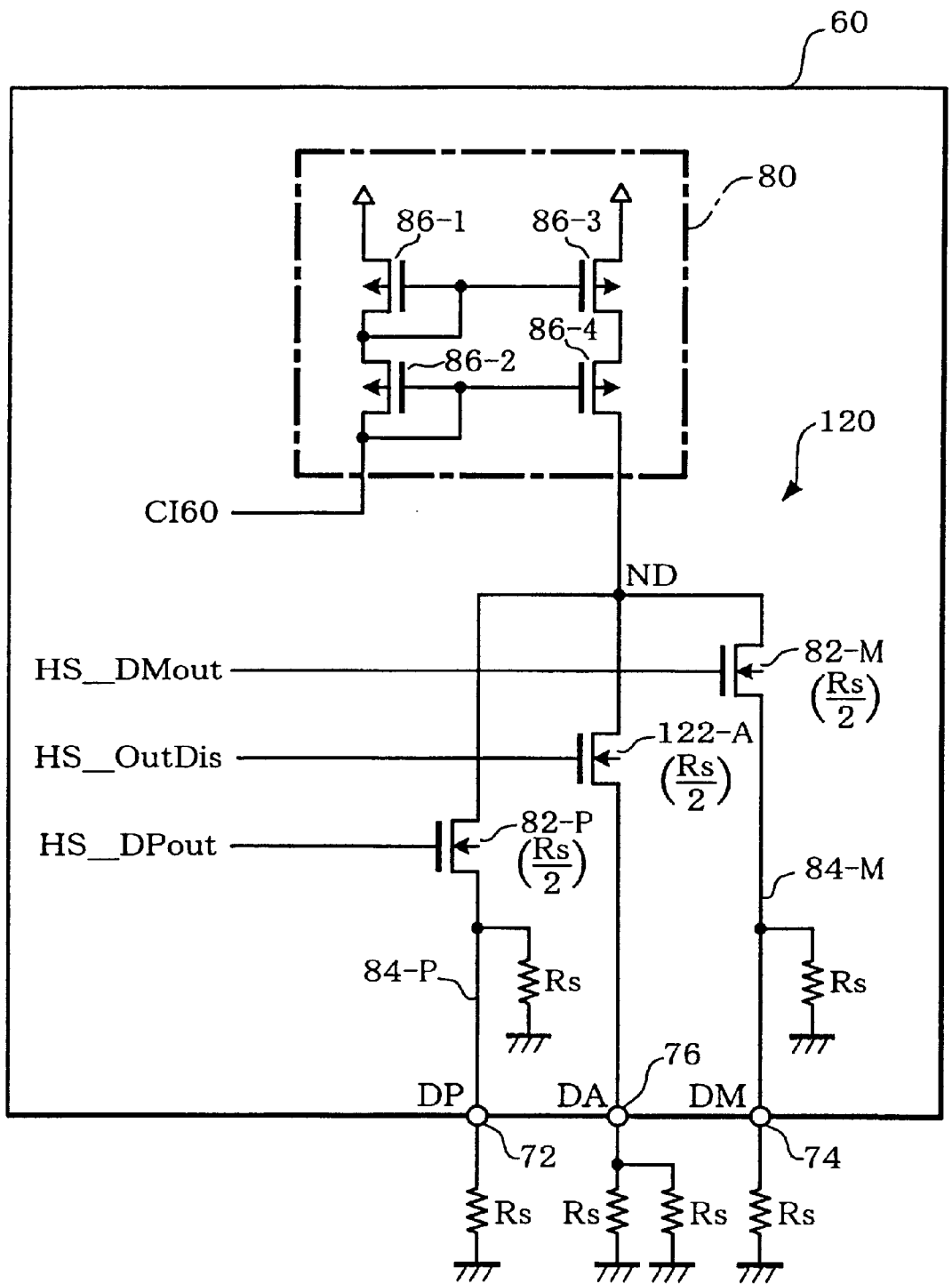
FIG. 9 is a configuration diagram showing an example of a configuration of a transmission circuit of a third embodiment.

FIG. 9 shows a configuration example of a transmission circuit of the third embodiment.

In FIG. 9, sections the same as those of the transmission circuit of the first embodiment shown in FIG. 5 are indicated by the same symbols. Description of these sections is omitted.

A transmission circuit 120 of the third embodiment transmits a signal conforming to the USB 2.0 in the data transfer control device 60.

The first difference between the transmission circuit 120 of the third embodiment and the transmission circuit 50 of the first embodiment is that the shape of an n-type MOS transistor 122-A used as the switching device SW3 differs from that of the n-type MOS transistor 82-A.

The second difference between the transmission circuit 120 of the third embodiment and the transmission circuit 50 of the first embodiment is that a resistance element having an impedance of Rs/2 is connected to the DA terminal 76 outside the data transfer control device.

Specifically, in the transmission circuit 120, the n-type MOS transistor 122-A is formed in the same shape as the n-type MOS transistors 82-P and 82-M so that Wp:Wm:Wa is 1:1:1, whereby the impedance of the on-resistance when the n-type MOS transistor 122-A is turned on by HS_OutDis becomes Rs/2. Moreover, the resistance element having an impedance of Rs/2 is connected to the DA terminal 76 outside the data transfer control device.

This enables the impedance of the current path from the node ND to the DA terminal 76 to be Rs/2, whereby the impedances of the current paths from the node ND through the n-type MOS transistors 82-P, 82-M, and 122-A are substantially equal to Rs.

The operation of the transmission circuit 120 of the third embodiment having the above configuration is the same as that of the transmission circuit 50 in the first embodiment. Therefore, further description is omitted.

Therefore, the transmission circuit 120 of the third embodiment has effects the same as those of the transmission circuit 50 of the first embodiment. Moreover, since the transistors connected to the node ND as the switching devices have the same shape, variation of the on-resistance of each transistor connected to the node ND due to process variation can be absorbed. Moreover, it is unnecessary to provide the resistance element 104 in the data transfer control device differing from the second embodiment, whereby the size and cost of the transmission circuit can be reduced.

Fourth Embodiment

Figure 10:
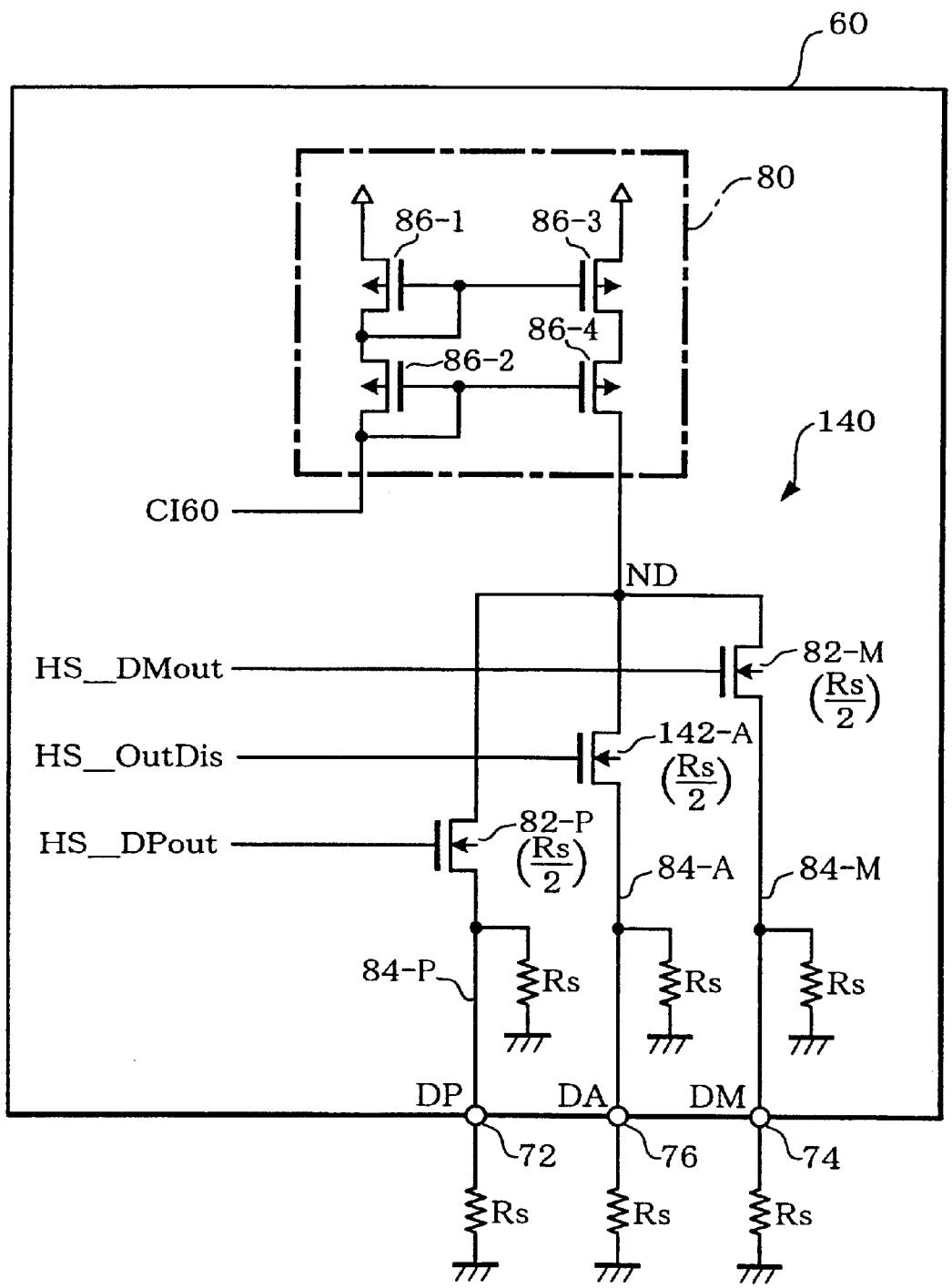
FIG. 10 is a configuration diagram showing an example of a configuration of a transmission circuit of a fourth embodiment.

FIG. 10 shows a configuration example of a transmission circuit of the fourth embodiment.

In FIG. 10, sections the same as those of the transmission circuit of the first embodiment shown in FIG. 5 are indicated by the same symbols. Description of these sections is omitted.

A transmission circuit 140 of the fourth embodiment transmits a signal conforming to the USB 2.0 in the data transfer control device 60.

The first difference between the transmission circuit 140 of the fourth embodiment and the transmission circuit 50 of the first embodiment is that the shape of an n-type MOS transistor 142-A used as the switching device SW3 differs from that of the n-type MOS transistor 82-A.

The second difference between the transmission circuit 140 of the fourth embodiment and the transmission circuit 50 of the first embodiment is that a resistance element having an impedance of Rs is connected between a third transmission signal line 84-A which electrically connects the drain terminal of the n-type MOS transistor 142-A with the DA terminal 76 and the second power supply AVSS.

The third difference between the transmission circuit 140 of the fourth embodiment and the transmission circuit 50 of the first embodiment is that a resistance element having an impedance of Rs is connected to the DA terminal 76 outside the data transfer control device.

Specifically, in the transmission circuit 140, the n-type MOS transistor 142-A is formed in the same shape as the n-type MOS transistors 82-P and 82-M so that Wp:Wm:Wa is 1:1:1, whereby the impedance of the on-resistance when the n-type MOS transistor 142-A is turned on by HS_OutDis becomes Rs/2. The resistance element having an impedance of Rs is connected between the third transmission signal line 84-A and the second power supply AVSS, and the DA terminal 76 is terminated by the resistance element having an impedance of Rs.

This enables the impedance of the current path from the node ND to the DA terminal 76 to be Rs/2, whereby the impedances of the current paths from the node ND through the n-type MOS transistors 82-P, 82-M, and 142-A are substantially equal to Rs.

The operation of the transmission circuit 140 of the fourth embodiment having the above configuration is the same as that of the transmission circuit 50 of the first embodiment. Therefore, further description is omitted.

Therefore, the transmission circuit 140 of the fourth embodiment has effects the same as those of the transmission circuit 50 in the first embodiment. Moreover, since the transistors connected to the node ND as the switching devices have the same shape, variation of the on-resistance of each transistor connected to the node ND due to process variation can be absorbed. Moreover, since the DA terminal has the same configuration as the DP terminal and the DM terminal, the number of design steps such as cell appropriation and layout arrangement can be reduced and the characteristics can be easily made uniform.

Fifth Embodiment

Figure 11:
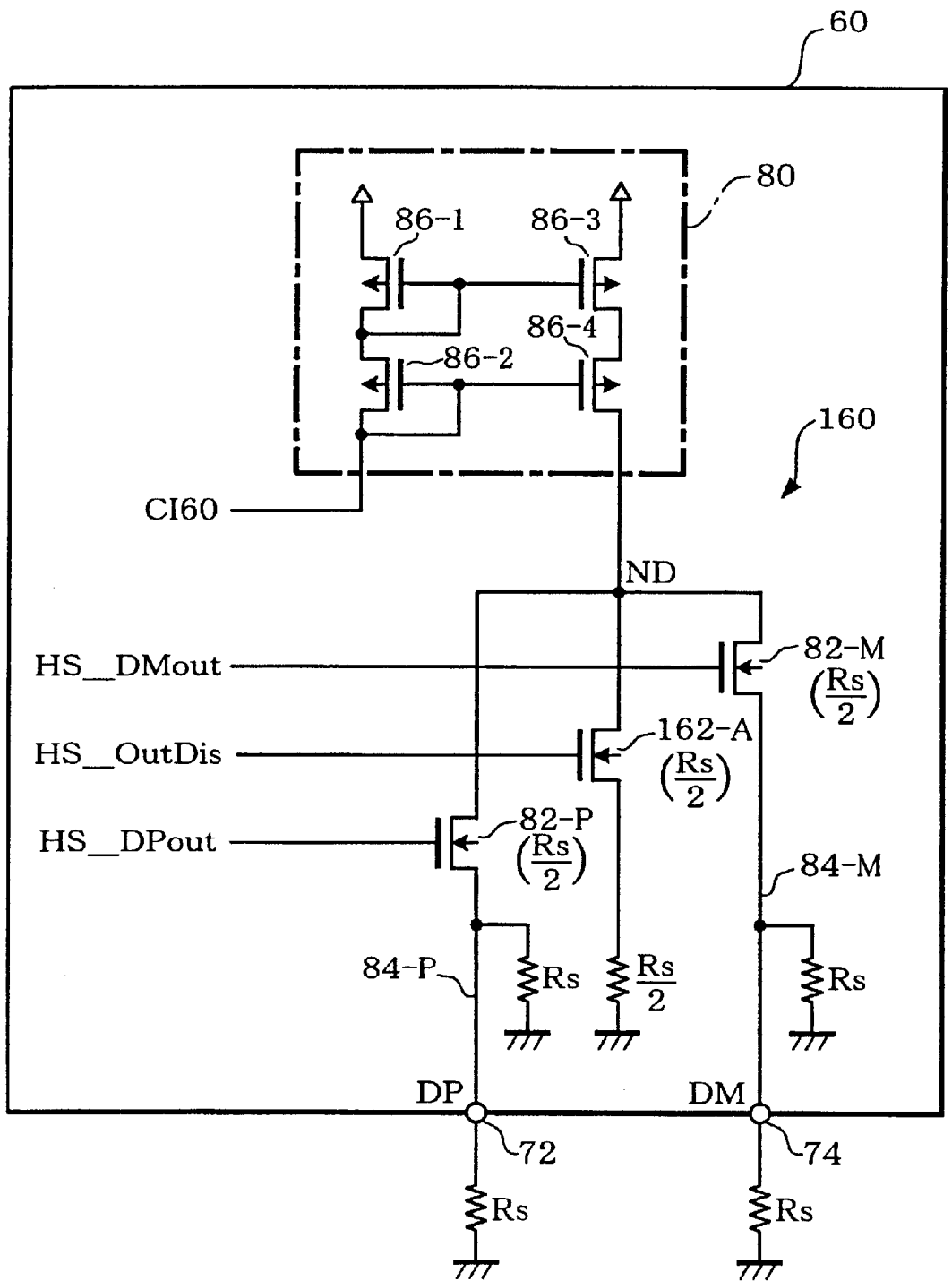
FIG. 11 is a configuration diagram showing an example of a configuration of a transmission circuit of a fifth embodiment.

FIG. 11 shows a configuration example of a transmission circuit of the fifth embodiment.

In FIG. 11, sections the same as those of the transmission circuit of the first embodiment shown in FIG. 5 are indicated by the same symbols. Description of these sections is omitted.

A transmission circuit 160 of the fifth embodiment transmits a signal conforming to the USB 2.0 in the data transfer control device 60.

The first difference between the transmission circuit 160 of the fifth embodiment and the transmission circuit 50 of the first embodiment is that the shape of an n-type MOS transistor 162-A used as the switching device SW3 differs from that of the n-type MOS transistor 82-A.

The second difference between the transmission circuit 160 of the fifth embodiment and the transmission circuit 50 of the first embodiment is that a resistance element having an impedance of Rs/2 is inserted between the n-type MOS transistor 162-A and the second power supply AVSS.

The third difference between the transmission circuit 160 of the fifth embodiment and the transmission circuit 50 of the first embodiment is that the DA terminal is omitted.

Specifically, in the transmission circuit 160, the n-type MOS transistor 162-A is formed in the same shape as the n-type MOS transistors 82-P and 82-M so that wp:Wm:Wa is 1:1:1, whereby the impedance of the on-resistance when the n-type MOS transistor 162-A is turned on by HS_OutDis becomes Rs/2. Moreover, the resistance element having an impedance of Rs/2 is connected between the drain terminal of the n-type MOS transistor 162-A and the second power supply AVSS, and the DA terminal is omitted.

This enables the impedance of the current path from the node ND to the n-type MOS transistor 162-A to be Rs, whereby the impedances of the current paths from the node ND through the n-type MOS transistors 82-P, 82-M, and 162-A are substantially equal to Rs.

The operation of the transmission circuit 160 of the fifth embodiment having the above configuration is the same as that of the transmission circuit 50 of the first embodiment. Therefore, further description is omitted.

Therefore, the transmission circuit 160 of the fifth embodiment has effects the same as those of the transmission circuit 50 of the first embodiment. Moreover, since the transistors connected to the node ND as the switching devices have the same shape, variation of the on-resistance of each transistor connected to the node ND due to process variation can be absorbed. Moreover, since the drain terminal of the n-type MOS transistor 162-A used as the switching device SW3 is connected to the second power supply AVSS in the data transfer control device, the number of terminals can be decreased, thereby reducing cost of the data transfer control device.

4. Electronic Equipment

An example of electronic equipment to which the data transfer control devices including the transmission circuit of the first to fifth embodiments is described below.

Figure 12A:
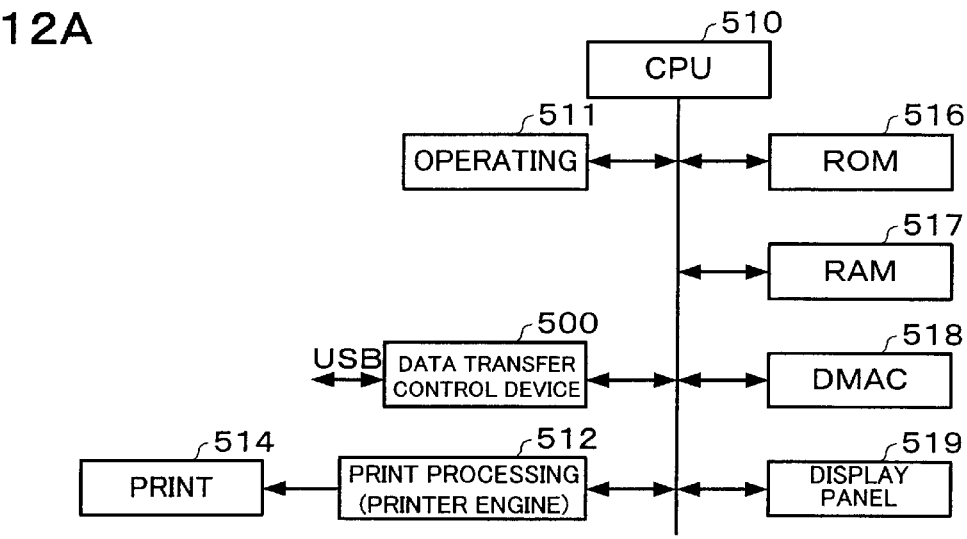
FIGS. 12A, 12B, and 12C show examples of internal block diagrams of various types of electronic equipment.
Figure 13A:
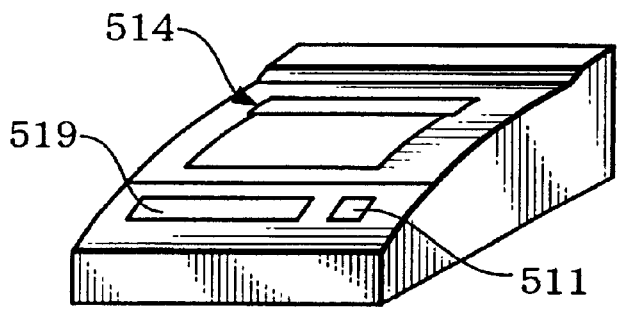
FIGS. 13A, 13B, and 13C show examples of the appearances of various types of electronic equipment.

FIG. 12A is an internal block diagram of a printer which is an example of the electronic equipment. FIG. 13A is a view showing the appearance of the printer. A CPU (microcomputer) 510 controls the entire system and the like. An operating section 511 allows the user to operate the printer. Control programs, fonts, and the like are stored in a ROM 516. A RAM 517 functions as a work area of the CPU 510. A DMAC 518 is a DMA controller for transferring data without using the CPU 510.

A display panel 519 informs the user of the operation state of the printer.

Serial print data sent from other devices such as a personal computer through the USB is converted into parallel print data by a data transfer control device 500. The converted parallel print data is sent to a print processing section (printer engine) 512 by the CPU 510 or DMAC 518. The parallel print data is subjected to given processing in the print processing section 512, and printed on paper by a print section (device which performs output processing on data) 514 consisting of a print head and the like.

Figure 12B:
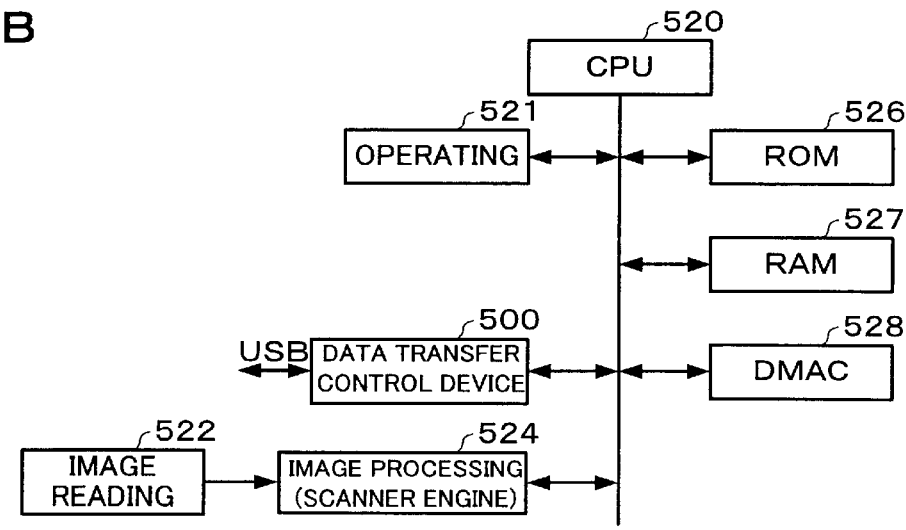
Figure 13B:
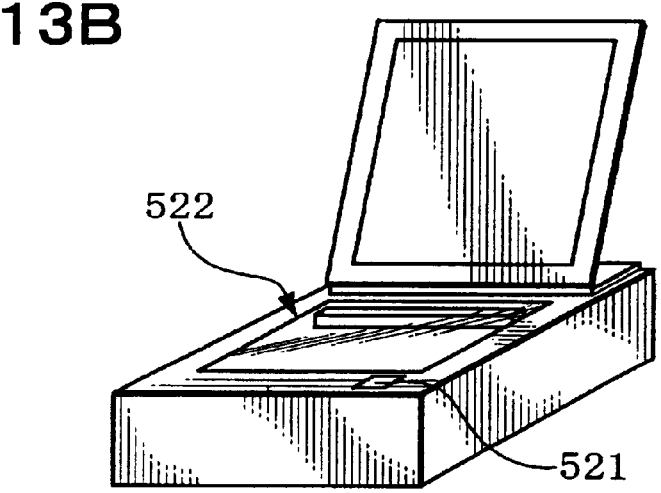

FIG. 12B is an internal block diagram of a scanner which is an example of the electronic equipment. FIG. 13B is a view showing the appearance of the scanner. A CPU 520 controls the entire system and the like. An operating section 521 allows the user to operate the scanner. Control programs and the like are stored in a ROM 526. A RAM 527 functions as a work area of the CPU 520. A DMAC 528 is a DMA controller.

An image of a manuscript is scanned by a image reading section (device which fetches data) 522 consisting of a light source, optical/electrical converter, and the like. The read image data is processed by an image processing section (scanner engine) 524. The processed image data is sent to the data transfer control device 500 by the CPU 520 or DMAC 528. The data transfer control device 500 converts this parallel image data into serial data, and transmits the data to other devices such as a personal computer through the USB.

Figure 12C:
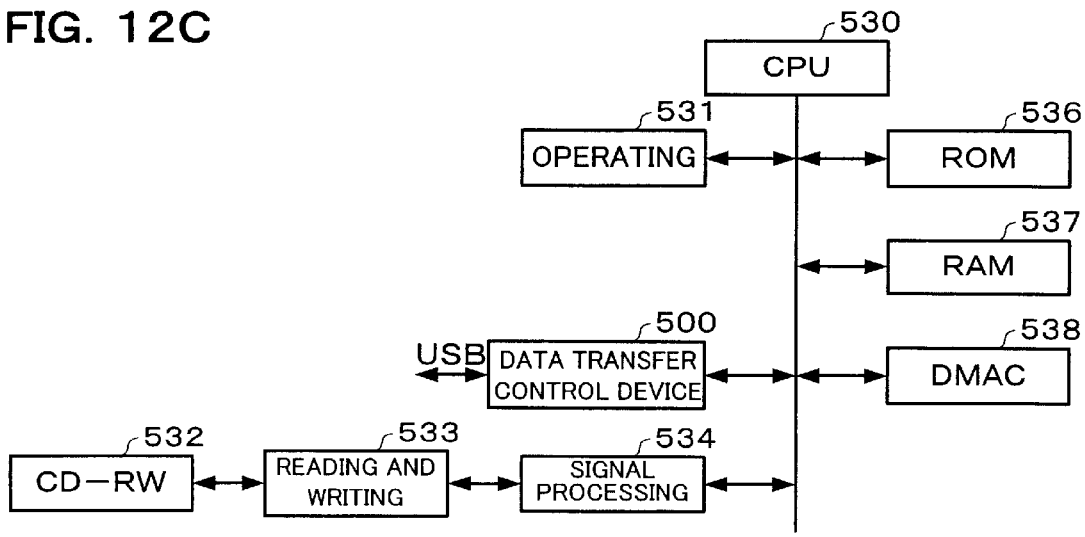
Figure 13C:
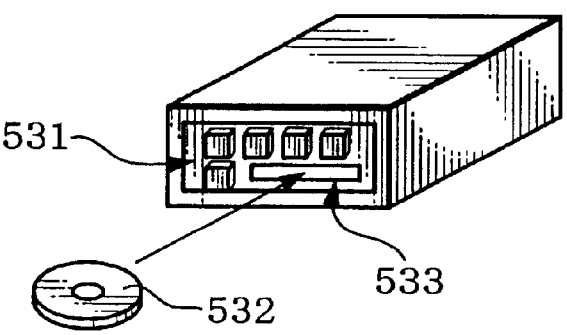

FIG. 12C is an internal block diagram of a CD-RW drive which is an example of the electronic equipment. FIG. 13C is a view showing the appearance of the CD-RW drive. A CPU 530 controls the entire system and the like. An operating section 531 allows the user to operate the CD-RW. Control programs and the like are stored in a ROM 536. A RAM 537 functions as a work area of the CPU 530. A DMAC 538 is a DMA controller.

Data read from a CD-RW 532 by a read & write section (device for reading data or device for storing data) 533 consisting of a laser, motor, optical system, and the like is input to a signal processing section 534, and subjected to given signal processing such as error correction processing. The signal-processed data is sent to the data transfer control device 500 by the CPU 530 or DMAC 538. The data transfer control device 500 converts this parallel data into serial data and transmits the data to other devices such as a personal computer through the USB.

Serial data sent from other devices through the USB is converted into parallel data by the data transfer control device 500. This parallel data is sent to the signal processing section 534 by the CPU 530 or DMAC 538. The parallel data is subjected to given processing in the signal processing section 534 and stored on the CD-RW 532 by the read & write section 533.

In FIGS. 12A, 12B, and 12C, a CPU for controlling data transfer in the data transfer control device 500 may be provided in addition to the CPUs 510, 520 and 530.

Data transfer in the USB 2.0 HS mode can be realized by using the data transfer control device including any of the transmission circuits of the first to fifth embodiments in the electronic equipment. Therefore, printing can be completed with less of a time lag after receiving the user's instruction through a personal computer or the like. Moreover, the user can see an image read by a scanner with less of a time lag after sending instructions to the scanner to read the image. Furthermore, data can be read from or written into the CD-RW at high speed.

A data transfer control device capable of transferring data in the HS mode can be manufactured using a conventional semiconductor process at a low manufacturing cost by using the data transfer control device including any of the transmission circuits of the first to fifth embodiments in the electronic equipment. Therefore, costs of the data transfer control device and the electronic equipment can be reduced. Moreover, reliability of data transfer can be improved, whereby reliability of the electronic equipment can also be improved.

In addition, it becomes possible to deal with demand from various types of manufacturers of electronic equipment by using the data transfer control device including any of the transmission circuits of the first to fifth embodiments in the electronic equipment while maintaining the performance of the data transfer control device. This increases the added value of the electronic equipment.

As the electronic equipment to which the data transfer control device including any of the transmission circuits of the first to fifth embodiments can be applied, in addition to the above examples, various types of optical disk drives (CD-ROM and DVD), magneto-optical disk drives (MO), hard disk drives, TVs, VTRs, video cameras, audio equipment, telephones, projectors, personal computers, electronic notebooks, word processors, and the like can be given.

The present invention is not limited to the above-described embodiments. Various modifications and variations are possible within the spirit and scope of the present invention.

The present invention is particularly preferably applied to the USB 2.0 interface (data transfer). However, the application of the present invention is not limited thereto. For example, the present invention may be applied to interfaces of standards based on the same idea as the USB 2.0 and standards developed from the USB 2.0.

What is claimed is:

1. A transmission circuit which transmits a signal through first and second signal lines forming a differential pair, the transmission circuit comprising:

a current source connected between a first power supply and a given node;

a first switching device inserted between the node and the first signal line;

a second switching device inserted between the node and the second signal line; and a third switching device inserted between the node and a second power supply, wherein one of the first and second signal lines is driven by current from the current source through one of the first and second switching devices in a signal-transmission period, and wherein the node is connected to the second power supply through the third switching device in a period other than the signal-transmission period.

2. The transmission circuit as defined in claim 1, wherein a signal transmitted through the first and second signal lines, which form the differential pair, is a signal conforming to the Universal Serial Bus (USB) standard.

3. A data transfer control device comprising:

a circuit which performs given transmission processing; and the transmission circuit as defined in claim 2 which transmits a signal based on the transmission processing.

4. A data transfer control device comprising:

a circuit which performs given transmission processing; and the transmission circuit as defined in claim 1 which transmits a signal based on the transmission processing.

5. A transmission circuit which transmits a signal through a differential pair of first and second signal lines which are terminated at a given impedance Z0, the transmission circuit comprising:

a current source connected between a first power supply and a given node;

a first transistor which is inserted between the node and the first signal line and has an impedance substantially equal to an impedance Z0 when the first transistor is turned on;

a second transistor which is inserted between the node and the second signal line and has an impedance substantially equal to the impedance Z0 when the second transistor is turned on; and a third transistor which is inserted between the node and a second power supply and has an impedance twice the impedance Z0 when the third transistor is turned on;

wherein one of the first and second signal lines is driven by the current source through one of the first and second transistors in a signal-transmission period, and wherein the node is connected to the second power supply through the third transistor in a period other than the signal-transmission period.

6. The transmission circuit as defined in claim 5, comprising:

a load element having an impedance substantially equal to the impedance Z0, one end of the load element being connected to the second power supply, wherein the third transistor has an impedance substantially equal to the impedance Z0 when the third transistor is turned on, and is inserted between the other end of the load element and the node.

7. A data transfer control device comprising:

a circuit which performs given transmission processing; and the transmission circuit as defined in claim 6 which transmits a signal based on the transmission processing.

8. The transmission circuit as defined in claim 5, wherein at least one of the first to third transistors is an n-type MOS transistor.

9. A data transfer control device comprising:

a circuit which performs given transmission processing; and the transmission circuit as defined in claim 8 which transmits a signal based on the transmission processing.

10. The transmission circuit as defined in claim 5, wherein a signal transmitted through the first and second signal lines, which form the differential pair, is a signal conforming to the Universal Serial Bus (USB) standard.

11. A data transfer control device comprising:

a circuit which performs given transmission processing; and the transmission circuit as defined in claim 10 which transmits a signal based on the transmission processing.

12. A data transfer control device comprising:

a circuit which performs given transmission processing; and the transmission circuit as defined in claim 5 which transmits a signal based on the transmission processing.

13. A transmission circuit which transmits a signal through a differential pair of first and second signal lines which are terminated at a given impedance Z0, the transmission circuit comprising:

a current source connected between a first power supply and a given node;

first and second connection terminals connected to the first and second signal lines;

a third connection terminal connected to a second power supply outside the transmission circuit;

a first transistor which is inserted between the node and the first connection terminal and has an impedance substantially equal to an impedance Z0/2 when the first transistor is turned on;

a second transistor which is inserted between the node and the second connection terminal and has an impedance substantially equal to the impedance Z0/2 when the second transistor is turned on;

a third transistor which is inserted between the node and the third connection terminal and has an impedance substantially equal to an impedance Z0 when the third transistor is turned on;

a first load element which is connected between a first transmission signal line connecting the first transistor with the first connection terminal and the second power supply, and has an impedance substantially equal to the impedance Z0; and a second load element which is connected between a second transmission signal line connecting the second transistor with the second connection terminal and the second power supply, and has an impedance substantially equal to the impedance Z0, wherein one of the first and second signal lines is driven by the current source through one of the first and second transistors in a signal-transmission period, and wherein the node is connected to the second power supply through the third transistor in a period other than the signal-transmission period.

14. The transmission circuit as defined in claim 13, comprising:

a third load element which is connected between the third transistor and the third connection terminal and has an impedance substantially equal to the impedance Z0/2, wherein the third transistor has an impedance substantially equal to the impedance Z0/2 when the third transistor is turned on.

15. A data transfer control device comprising:

a circuit which performs given transmission processing; and the transmission circuit as defined in claim 5 which transmits a signal based on the transmission processing.

16. The transmission circuit as defined in claim 13, wherein the third transistor has an impedance substantially equal to the impedance Z0/2 when the third transistor is turned on, and wherein the third connection terminal is terminated at an impedance substantially equal to the impedance Z0/2 outside the transmission circuit.

17. A data transfer control device comprising:

a circuit which performs given transmission processing; and the transmission circuit as defined in claim 16 which transmits a signal based on the transmission processing.

18. The transmission circuit as defined in claim 13, comprising:

a fourth load element which is connected between a third transmission signal line connecting the third transistor with the third connection terminal and the second power supply, and has an impedance substantially equal to the impedance Z0, wherein the third transistor has an impedance substantially equal to the impedance Z0/2 when the third transistor is turned on, and wherein the third connection terminal is terminated at an impedance substantially equal to the impedance Z0 outside the transmission circuit.

19. A data transfer control device comprising:

a circuit which performs given transmission processing; and the transmission circuit as defined in claim 18 which transmits a signal based on the transmission processing.

20. The transmission circuit as defined in claim 13, comprising:

a fifth load element which is inserted between the third transistor and the second power supply and has an impedance substantially equal to the impedance Z0/2, wherein the third transistor has an impedance substantially equal to the impedance Z0/2 when the third transistor is turned on, and wherein the third connection terminal is omitted.

21. A data transfer control device comprising:

a circuit which performs given transmission processing; and the transmission circuit as defined in claim 20 which transmits a signal based on the transmission processing.

22. The transmission circuit as defined in claim 13, wherein at least one of the first to third transistors is an n-type MOS transistor.

23. A data transfer control device comprising:

a circuit which performs given transmission processing; and the transmission circuit as defined in claim 22 which transmits a signal based on the transmission processing.

24. The transmission circuit as defined in claim 13, wherein a signal transmitted through the first and second signal lines, which form the differential pair, is a signal conforming to the Universal Serial Bus (USB) standard.

25. A data transfer control device comprising:

a circuit which performs given transmission processing; and the transmission circuit as defined in claim 24 which transmits a signal based on the transmission processing.

26. A data transfer control device comprising:

a circuit which performs given transmission processing; and the transmission circuit as defined in claim 13 which transmits a signal based on the transmission processing.

27. A transmission circuit which transmits a signal through a differential pair of first and second signal lines which are terminated at a given impedance Z0, the transmission circuit comprising:

a current source connected between a first power supply and a given node;

first and second connection terminals connected to the first and second signal lines;

a third connection terminal connected to a second power supply outside the transmission circuit;

a first transistor which is inserted between the node and the first connection terminal and has an impedance substantially equal to an impedance Z0/2 when the first transistor is turned on;

a second transistor which is inserted between the node and the second connection terminal and has an impedance substantially equal to the impedance Z0/2 when the second transistor is turned on;

a third transistor which is inserted between the node and the third connection terminal and has an impedance substantially equal to an impedance Z0 when the third transistor is turned on;

a first load element which is connected between a first transmission signal line connecting the first transistor with the first connection terminal and the second power supply, and has an impedance substantially equal to the impedance Z0; and a second load element which is connected between a second transmission signal line connecting the second transistor with the second connection terminal and the second power supply, and has an impedance substantially equal to the impedance Z0, wherein at least one of the first to third transistors is an n-type MOS transistor, wherein a signal transmitted through the first and second signal lines, which form the differential pair, is a signal conforming to the Universal Serial Bus (USB) standard, wherein one of the first and second signal lines is driven by the current source through one of the first and second transistors in a signal-transmission period, and wherein the node is connected to the second power supply through the third transistor in a period other than the signal-transmission period.

28. A data transfer control device comprising:

a circuit which performs given transmission processing; and the transmission circuit as defined in claim 27 which transmits a signal based on the transmission processing.

29. Electronic equipment comprising:

the data transfer control device as defined in claim 27; and a device which performs output processing, fetch processing, or storage processing on data transferred through the data transfer control device and a bus.

30. A transmission circuit which transmits a signal through a differential pair of first and second signal lines which are terminated at a given impedance Z0, the transmission circuit comprising:

a current source connected between a first power supply and a given node;

first and second connection terminals connected to the first and second signal lines;

a third connection terminal connected to a second power supply outside the transmission circuit;

a first transistor which is inserted between the node and the first connection terminal and has an impedance substantially equal to an impedance Z0/2 when the first transistor is turned on;

a second transistor which is inserted between the node and the second connection terminal and has an impedance substantially equal to the impedance Z0/2 when the second transistor is turned on;

a third transistor which is inserted between the node and the third connection terminal and has an impedance substantially equal to an impedance Z0/2 when the third transistor is turned on;

a first load element which is connected between a first transmission signal line connecting the first transistor with the first connection terminal and the second power supply, and has an impedance substantially equal to the impedance Z0; and a second load element which is connected between a second transmission signal line connecting the second transistor with the second connection terminal and the second power supply, and has an impedance substantially equal to the impedance Z0; and a third load element which is connected between the third transistor and the third connection terminal and has an impedance substantially equal to the impedance Z0/2, wherein at least one of the first to third transistors is an n-type MOS transistor, wherein a signal transmitted through the first and second signal lines, which form the differential pair, is a signal conforming to the Universal Serial Bus (USB) standard, wherein one of the first and second signal lines is driven by the current source through one of the first and second transistors in a signal-transmission period, and wherein the node is connected to the second power supply through the third transistor in a period other than the signal-transmission period.

31. A data transfer control device comprising:
a circuit which performs given transmission processing; and
the transmission circuit as defined in claim 30 which transmits a signal based on the transmission processing.

32. Electronic equipment comprising:
the data transfer control device as defined in claim 30; and
a device which performs output processing, fetch processing, or storage processing on data transferred through the data transfer control device and a bus.

33. A transmission circuit which transmits a signal through a differential pair of first and second signal lines which are terminated at a given impedance Z0, the transmission circuit comprising:
a current source connected between a first power supply and a given node;
first and second connection terminals connected to the first and second signal lines;
a third connection terminal connected to a second power supply outside the transmission circuit;
a first transistor which is inserted between the node and the first connection terminal and has an impedance substantially equal to an impedance Z0/2 when the first transistor is turned on;
a second transistor which is inserted between the node and the second connection terminal and has an impedance substantially equal to the impedance Z0/2 when the second transistor is turned on;
a third transistor which is inserted between the node and the third connection terminal and has an impedance substantially equal to an impedance Z0/2 when the third transistor is turned on;
a first load element which is connected between a first transmission signal line connecting the first transistor with the first connection terminal and the second power supply, and has an impedance substantially equal to the impedance Z0; and
a second load element which is connected between a second transmission signal line connecting the second transistor with the second connection terminal and the second power supply, and has an impedance substantially equal to the impedance Z0,
wherein at least one of the first to third transistors is an n-type MOS transistor,
wherein a signal transmitted through the first and second signal lines, which form the differential pair, is a signal conforming to the Universal Serial Bus (USB) standard,
wherein one of the first and second signal lines is driven by the current source through one of the first and second transistors in a signal-transmission period,
wherein the node is connected to the second power supply through the third transistor in a period other than the signal-transmission period, and
wherein the third connection terminal is terminated at an impedance substantially equal to the impedance Z0/2 outside the transmission circuit.

34. A data transfer control device comprising:
a circuit which performs given transmission processing; and
the transmission circuit as defined in claim 33 which transmits a signal based on the transmission processing.

35. A transmission circuit which transmits a signal through a differential pair of first and second signal lines which are terminated at a given impedance Z0, the transmission circuit comprising:
a current source connected between a first power supply and a given node;
first and second connection terminals connected to the first and second signal lines;
a third connection terminal connected to a second power supply outside the transmission circuit;
a first transistor which is inserted between the node and the first connection terminal and has an impedance substantially equal to an impedance Z0/2 when the first transistor is turned on;
a second transistor which is inserted between the node and the second connection terminal and has an impedance substantially equal to the impedance Z0/2 when the second transistor is turned on;
a third transistor which is inserted between the node and the third connection terminal and has an impedance substantially equal to an impedance Z0/2 when the third transistor is turned on;
a first load element which is connected between a first transmission signal line connecting the first transistor with the first connection terminal and the second power supply, and has an impedance substantially equal to the impedance Z0; and
a second load element which is connected between a second transmission signal line connecting the second transistor with the second connection terminal and the second power supply, and has an impedance substantially equal to the impedance Z0; and
a third load element which is connected between a third transmission signal line connecting the third transistor with the third connection terminal and the second power supply, and has an impedance substantially equal to the impedance Z0,
wherein at least one of the first to third transistors is an n-type MOS transistor,
wherein a signal transmitted through the first and second signal lines, which form the differential pair, is a signal conforming to the Universal Serial Bus (USB) standard,
wherein one of the first and second signal lines is driven by the current source through one of the first and second transistors in a signal-transmission period,
wherein the node is connected to the second power supply through the third transistor in a period other than the signal-transmission period, and
wherein the third connection terminal is terminated at an impedance substantially equal to the impedance Z0 outside the transmission circuit.

36. A data transfer control device comprising:
a circuit which performs given transmission processing; and
the transmission circuit as defined in claim 35 which transmits a signal based on the transmission processing.

37. Electronic equipment comprising:
the data transfer control device as defined in claim 35; and
a device which performs output processing, fetch processing, or storage processing on data transferred through the data transfer control device and a bus.

38. A transmission circuit which transmits a signal through a differential pair of first and second signal lines which are terminated at a given impedance Z0, the transmission circuit comprising:

a current source connected between a first power supply and a given node;

first and second connection terminals connected to the first and second signal lines;

a first transistor which is inserted between the node and the first connection terminal and has an impedance substantially equal to an impedance Z0/2 when the first transistor is turned on;

a second transistor which is inserted between the node and the second connection terminal and has an impedance substantially equal to the impedance Z0/2 when the second transistor is turned on;

a third transistor which is connected to the node and has an impedance substantially equal to the impedance Z0/2 when turned on;

a first load element which is connected between a first transmission signal line connecting the first transistor with the first connection terminal and the second power supply, and has an impedance substantially equal to the impedance Z0; and a second load element which is connected between a second transmission signal line connecting the second transistor with the second connection terminal and the second power supply, and has an impedance substantially equal to the impedance Z0; and a third load element which is inserted between the third transistor and the second power supply and has an impedance substantially equal to the impedance Z0/2, wherein at least one of the first to third transistors is an n-type MOS transistor, wherein a signal transmitted through the first and second signal lines, which form the differential pair, is a signal conforming to the Universal Serial Bus (USB) standard, wherein one of the first and second signal lines is driven by the current source through one of the first and second transistors in a signal-transmission period, and wherein the node is connected to the second power supply through the third transistor in a period other than the signal-transmission period.

39. A data transfer control device comprising:

a circuit which performs given transmission processing; and the transmission circuit as defined in claim 38 which transmits a signal based on the transmission processing.

* * * * *